US011232687B2

(12) United States Patent
Fisher et al.

(10) Patent No.: US 11,232,687 B2
(45) Date of Patent: Jan. 25, 2022

(54) DEEP LEARNING-BASED SHOPPER STATUSES IN A CASHIER-LESS STORE

(71) Applicant: STANDARD COGNITION, CORP, San Francisco, CA (US)

(72) Inventors: Jordan E. Fisher, San Francisco, CA (US); Michael S. Suswal, San Francisco, CA (US); David Valdman, San Francisco, CA (US); Alex Hu, San Francisco, CA (US); Juan C. Lasheras, San Francisco, CA (US)

(73) Assignee: STANDARD COGNITION, CORP, San Francisco, CA (US)

( * ) Notice: Subject to any disclaimer, the term of this patent is extended or adjusted under 35 U.S.C. 154(b) by 0 days.

(21) Appl. No.: 16/389,109

(22) Filed: Apr. 19, 2019

(65) Prior Publication Data
US 2019/0244500 A1    Aug. 8, 2019

Related U.S. Application Data

(63) Continuation-in-part of application No. 15/945,473, filed on Apr. 4, 2018, now Pat. No. 10,474,988.
(Continued)

(51) Int. Cl.
*G08B 13/196* (2006.01)
*G06T 13/80* (2011.01)
*G06K 9/00* (2006.01)

(52) U.S. Cl.
CPC ... *G08B 13/19682* (2013.01); *G06K 9/00664* (2013.01); *G06T 13/80* (2013.01); *G08B 13/19673* (2013.01)

(58) Field of Classification Search
CPC ........... G06K 9/00664; G06K 9/00771; G06K 9/6273; G06T 13/80; G08B 13/19673; G08B 13/19682
See application file for complete search history.

(56) References Cited

U.S. PATENT DOCUMENTS 6,154,559 A    11/2000    Beardsley
6,561,417 B1    5/2003    Gadd
(Continued)

FOREIGN PATENT DOCUMENTS

CN    104778690 B    6/2017
EP    1574986 B1    7/2008
(Continued)

OTHER PUBLICATIONS

Longuet-Higgens, "A computer algorithm for reconstructing a scene from two projections," Nature 293, Sep. 10, 1981, pp. 133-135.
(Continued)

*Primary Examiner* — Anner N Holder
(74) *Attorney, Agent, or Firm* — Haynes Beffel & Wolfeld LLP; Mark Haynes; Andrew Dunlap

(57) ABSTRACT

Systems and techniques are provided for monitoring status of subjects in an area of real space. The system includes a display having access to memory storing a first data set identifying locations of subjects in the area of real space over time, a second data set identifying item put and take events in the area of real space and a third data set identifying accounts matched to the subjects in the first data set. The system includes a graphical user interface logic that renders a map on the display of at least part of the area of real space including avatars having locations on the map corresponding to locations in the area of real space according to the first data set, and identifying respective statuses assigned to the subjects based on one or more of the first data set, the second data set and the third data set.

21 Claims, 19 Drawing Sheets

Related U.S. Application Data which is a continuation-in-part of application No. 15/907,112, filed on Feb. 27, 2018, now Pat. No. 10,133,933, which is a continuation-in-part of application No. 15/847,796, filed on Dec. 19, 2017, now Pat. No. 10,055,853.

(60) Provisional application No. 62/703,785, filed on Jul. 26, 2018, provisional application No. 62/542,077, filed on Aug. 7, 2017.

(56) References Cited

U.S. PATENT DOCUMENTS

| | | |
|---|---|---|
| 7,050,624 B2 | 5/2006 | Dialameh et al. |
| 7,050,652 B2 | 5/2006 | Stanek |
| 7,742,623 B1 | 6/2010 | Moon et al. |
| 8,009,863 B1 | 8/2011 | Sharma et al. |
| 8,219,438 B1 | 7/2012 | Moon et al. |
| 8,261,256 B1 | 9/2012 | Adler et al. |
| 8,279,325 B2 | 10/2012 | Pitts et al. |
| 8,577,705 B1 | 11/2013 | Baboo et al. |
| 8,624,725 B1 | 1/2014 | MacGregor |
| 8,749,630 B2 | 6/2014 | Alahi et al. |
| 9,036,028 B2 | 5/2015 | Buehler |
| 9,058,523 B2 | 6/2015 | Merkel et al. |
| 9,262,681 B1 | 2/2016 | Mishra |
| 9,269,012 B2 | 2/2016 | Fotland |
| 9,269,093 B2 | 2/2016 | Lee et al. |
| 9,294,873 B1 | 3/2016 | MacGregor |
| 9,449,233 B2 | 9/2016 | Taylor |
| 9,489,623 B1 | 11/2016 | Sinyavskiy et al. |
| 9,494,532 B2 | 11/2016 | Xie et al. |
| 9,536,177 B2 | 1/2017 | Chalasani et al. |
| 9,582,891 B2 | 2/2017 | Geiger et al. |
| 9,595,127 B2 | 3/2017 | Champion et al. |
| 9,652,751 B2 | 5/2017 | Aaron et al. |
| 9,846,810 B2 | 12/2017 | Partis |
| 9,881,221 B2 | 1/2018 | Bala et al. |
| 9,886,827 B2 | 2/2018 | Schoner |
| 9,911,290 B1 | 3/2018 | Zalewski et al. |
| 10,055,853 B1 | 8/2018 | Fisher et al. |
| 10,083,453 B2 | 9/2018 | Campbell |
| 10,127,438 B1 | 11/2018 | Fisher et al. |
| 10,133,933 B1 | 11/2018 | Fisher et al. |
| 10,165,194 B1 | 12/2018 | Baldwin |
| 10,169,677 B1 | 1/2019 | Ren et al. |
| 10,175,340 B1 | 1/2019 | Abari et al. |
| 10,192,408 B2 | 1/2019 | Schoner |
| 10,202,135 B2 | 2/2019 | Mian et al. |
| 10,210,737 B2 | 2/2019 | Zhao |
| 10,217,120 B1 | 2/2019 | Shin et al. |
| 10,242,393 B1 | 3/2019 | Kumar et al. |
| 10,262,331 B1 | 4/2019 | Sharma et al. |
| 10,332,089 B1 | 6/2019 | Asmi et al. |
| 10,354,262 B1 | 7/2019 | Hershey et al. |
| 10,387,896 B1 | 8/2019 | Hershey et al. |
| 10,438,277 B1 | 10/2019 | Jiang et al. |
| 10,445,694 B2 | 10/2019 | Fisher et al. |
| 10,474,877 B2 | 11/2019 | Huang et al. |
| 10,474,988 B2 | 11/2019 | Fisher et al. |
| 10,474,991 B2 | 11/2019 | Fisher et al. |
| 10,474,992 B2 | 11/2019 | Fisher et al. |
| 10,474,993 B2 | 11/2019 | Fisher et al. |
| 10,529,137 B1 | 1/2020 | Black et al. |
| 10,650,545 B2 | 5/2020 | Fisher et al. |
| 10,776,926 B2 | 9/2020 | Shrivastava |
| 10,810,539 B1 | 10/2020 | Mohanty et al. |
| 10,853,965 B2 | 12/2020 | Fisher et al. |
| 2003/0107649 A1 | 6/2003 | Flickner et al. |
| 2004/0099736 A1 | 5/2004 | Neumark |
| 2004/0131254 A1 | 7/2004 | Liang et al. |
| 2005/0177446 A1* | 8/2005 | Hoblit ............ G06Q 30/0601 705/26.1 |
| 2005/0201612 A1 | 9/2005 | Park et al. |
| 2006/0132491 A1 | 6/2006 | Riach et al. |
| 2006/0279630 A1 | 12/2006 | Aggarwal et al. |
| 2007/0021863 A1 | 1/2007 | Mountz et al. |
| 2007/0021864 A1 | 1/2007 | Mountz et al. |
| 2007/0182718 A1 | 8/2007 | Schoener et al. |
| 2007/0282665 A1 | 12/2007 | Buehler et al. |
| 2008/0001918 A1 | 1/2008 | Hsu et al. |
| 2008/0159634 A1 | 7/2008 | Sharma et al. |
| 2008/0170776 A1 | 7/2008 | Albertson et al. |
| 2008/0181507 A1 | 7/2008 | Gope et al. |
| 2008/0211915 A1 | 9/2008 | McCubbrey |
| 2008/0243614 A1 | 10/2008 | Tu et al. |
| 2009/0041297 A1 | 2/2009 | Zhang et al. |
| 2009/0057068 A1 | 3/2009 | Lin et al. |
| 2009/0083815 A1 | 3/2009 | McMaster et al. |
| 2009/0217315 A1 | 8/2009 | Malik et al. |
| 2009/0222313 A1 | 9/2009 | Kannan et al. |
| 2009/0307226 A1* | 12/2009 | Koster ............ A63F 13/79 |
| 2010/0021009 A1 | 1/2010 | Yao |
| 2010/0103104 A1 | 4/2010 | Son et al. |
| 2010/0208941 A1 | 8/2010 | Broaddus et al. |
| 2010/0283860 A1 | 11/2010 | Nader |
| 2011/0141011 A1 | 6/2011 | Lashina et al. |
| 2011/0209042 A1 | 8/2011 | Porter |
| 2011/0228976 A1 | 9/2011 | Fitzgibbon et al. |
| 2011/0317012 A1 | 12/2011 | Hammadou |
| 2011/0317016 A1 | 12/2011 | Saeki et al. |
| 2011/0320322 A1 | 12/2011 | Roslak et al. |
| 2012/0119879 A1 | 5/2012 | Estes et al. |
| 2012/0159290 A1 | 6/2012 | Pulsipher et al. |
| 2012/0209749 A1 | 8/2012 | Hammad et al. |
| 2012/0245974 A1 | 9/2012 | Bonner et al. |
| 2012/0271712 A1 | 10/2012 | Katzin et al. |
| 2012/0275686 A1 | 11/2012 | Wilson et al. |
| 2012/0290401 A1 | 11/2012 | Neven |
| 2013/0011007 A1 | 1/2013 | Muriello et al. |
| 2013/0011049 A1 | 1/2013 | Kimura |
| 2013/0076898 A1 | 3/2013 | Philippe et al. |
| 2013/0156260 A1 | 6/2013 | Craig |
| 2013/0182114 A1 | 7/2013 | Zhang et al. |
| 2013/0201339 A1 | 8/2013 | Venkatesh |
| 2014/0168477 A1 | 6/2014 | David |
| 2014/0188648 A1 | 7/2014 | Argue et al. |
| 2014/0207615 A1 | 7/2014 | Li et al. |
| 2014/0222501 A1* | 8/2014 | Hirakawa ......... G06Q 30/0201 705/7.29 |
| 2014/0282162 A1 | 9/2014 | Fein et al. |
| 2014/0285660 A1 | 9/2014 | Jamtgaard et al. |
| 2014/0304123 A1 | 10/2014 | Schwartz |
| 2015/0009323 A1 | 1/2015 | Lei |
| 2015/0012396 A1 | 1/2015 | Puerini et al. |
| 2015/0019391 A1 | 1/2015 | Kumar et al. |
| 2015/0026010 A1 | 1/2015 | Ellison |
| 2015/0026646 A1 | 1/2015 | Ahn et al. |
| 2015/0039458 A1 | 2/2015 | Reid |
| 2015/0049914 A1 | 2/2015 | Alves |
| 2015/0124107 A1 | 5/2015 | Muriello et al. |
| 2015/0206188 A1 | 7/2015 | Tanigawa et al. |
| 2015/0208043 A1 | 7/2015 | Lee et al. |
| 2015/0213391 A1 | 7/2015 | Hasan |
| 2015/0221094 A1 | 8/2015 | Marcheselli et al. |
| 2015/0262116 A1 | 9/2015 | Katircioglu et al. |
| 2015/0269740 A1 | 9/2015 | Mazurenko et al. |
| 2015/0294397 A1 | 10/2015 | Croy et al. |
| 2015/0302593 A1 | 10/2015 | Mazurenko et al. |
| 2015/0310459 A1 | 10/2015 | Bernal et al. |
| 2015/0327794 A1 | 11/2015 | Rahman et al. |
| 2015/0332312 A1 | 11/2015 | Cosman |
| 2015/0363868 A1 | 12/2015 | Kleinhandler et al. |
| 2015/0379366 A1 | 12/2015 | Nomura et al. |
| 2016/0095511 A1 | 4/2016 | Taguchi et al. |
| 2016/0110760 A1 | 4/2016 | Herring et al. |
| 2016/0125245 A1 | 5/2016 | Saitwal et al. |
| 2016/0155011 A1 | 6/2016 | Sulc et al. |
| 2016/0171707 A1 | 6/2016 | Schwartz |
| 2016/0188962 A1 | 6/2016 | Taguchi |
| 2016/0189286 A1 | 6/2016 | Zohar et al. |
| 2016/0203525 A1 | 7/2016 | Hara et al. |
| 2016/0217157 A1 | 7/2016 | Shih et al. |
| 2016/0217417 A1 | 7/2016 | Ma et al. |

(56) References Cited

U.S. PATENT DOCUMENTS

| | | |
|---|---|---|
| 2016/0259994 A1 | 9/2016 | Ravindran et al. |
| 2016/0358145 A1 | 12/2016 | Montgomery |
| 2016/0371726 A1 | 12/2016 | Yamaji et al. |
| 2016/0381328 A1 | 12/2016 | Zhao |
| 2017/0032193 A1 | 2/2017 | Yang |
| 2017/0068861 A1 | 3/2017 | Miller et al. |
| 2017/0116473 A1 | 4/2017 | Sashida et al. |
| 2017/0124096 A1 | 5/2017 | Hsi et al. |
| 2017/0154212 A1 | 6/2017 | Feris et al. |
| 2017/0161555 A1 | 6/2017 | Kumar et al. |
| 2017/0168586 A1 | 6/2017 | Sinha et al. |
| 2017/0178226 A1 | 6/2017 | Graham et al. |
| 2017/0206664 A1 | 7/2017 | Shen |
| 2017/0206669 A1 | 7/2017 | Saleemi et al. |
| 2017/0249339 A1 | 8/2017 | Lester |
| 2017/0255990 A1 | 9/2017 | Ramamurthy et al. |
| 2017/0278255 A1 | 9/2017 | Shingu et al. |
| 2017/0308911 A1 | 10/2017 | Barham et al. |
| 2017/0309136 A1 | 10/2017 | Schoner |
| 2017/0323376 A1 | 11/2017 | Glaser et al. |
| 2018/0003315 A1 | 1/2018 | Reed |
| 2018/0012072 A1 | 1/2018 | Glaser et al. |
| 2018/0012080 A1 | 1/2018 | Glaser et al. |
| 2018/0014382 A1 | 1/2018 | Glaser et al. |
| 2018/0025175 A1 | 1/2018 | Kato |
| 2018/0032799 A1 | 2/2018 | Marcheselli et al. |
| 2018/0033015 A1 | 2/2018 | Opalka et al. |
| 2018/0033151 A1 | 2/2018 | Matsumoto et al. |
| 2018/0068431 A1 | 3/2018 | Takeda et al. |
| 2018/0070056 A1 | 3/2018 | DeAngelis et al. |
| 2018/0088900 A1 | 3/2018 | Glaser et al. |
| 2018/0150788 A1 | 5/2018 | Vepakomma et al. |
| 2018/0165728 A1 | 6/2018 | McDonald et al. |
| 2018/0181995 A1 | 6/2018 | Burry et al. |
| 2018/0189600 A1 | 7/2018 | Astrom et al. |
| 2018/0217223 A1 | 8/2018 | Kumar et al. |
| 2018/0225625 A1 | 8/2018 | DiFatta et al. |
| 2018/0232796 A1 | 8/2018 | Glaser et al. |
| 2018/0240180 A1 | 8/2018 | Glaser et al. |
| 2018/0295424 A1 | 10/2018 | Taylor et al. |
| 2018/0322616 A1 | 11/2018 | Guigues |
| 2018/0329762 A1 | 11/2018 | Li et al. |
| 2018/0332235 A1 | 11/2018 | Glaser |
| 2018/0332236 A1 | 11/2018 | Glaser et al. |
| 2018/0343417 A1 | 11/2018 | Davey |
| 2018/0365755 A1 | 12/2018 | Bekbolatov et al. |
| 2018/0373928 A1 | 12/2018 | Glaser et al. |
| 2019/0005479 A1 | 1/2019 | Glaser et al. |
| 2019/0034735 A1 | 1/2019 | Cuban et al. |
| 2019/0043003 A1 | 2/2019 | Fisher et al. |
| 2019/0147709 A1 | 5/2019 | Schoner |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0188876 A1 | 6/2019 | Song et al. |
| 2019/0244386 A1 | 8/2019 | Fisher et al. |
| 2019/0244500 A1 | 8/2019 | Fisher et al. |
| 2019/0251340 A1 | 8/2019 | Brown et al. |
| 2019/0347611 A1 | 11/2019 | Fisher et al. |
| 2019/0377957 A1 | 12/2019 | Johnston et al. |
| 2019/0378205 A1 | 12/2019 | Glaser et al. |
| 2019/0392318 A1 | 12/2019 | Ghafoor et al. |
| 2020/0074165 A1 | 3/2020 | Ghafoor et al. |
| 2020/0074393 A1 | 3/2020 | Fisher et al. |
| 2020/0074394 A1 | 3/2020 | Fisher et al. |
| 2020/0074432 A1 | 3/2020 | Valdman et al. |
| 2020/0118400 A1 | 4/2020 | Zalewski et al. |
| 2020/0234463 A1 | 7/2020 | Fisher et al. |
| 2020/0258241 A1 | 8/2020 | Liu et al. |
| 2020/0334834 A1 | 10/2020 | Fisher |
| 2020/0410713 A1 | 12/2020 | Auer et al. |
| 2021/0201253 A1 | 7/2021 | Fisher et al. |

FOREIGN PATENT DOCUMENTS

| | | |
|---|---|---|
| EP | 2555162 A1 | 2/2013 |
| EP | 3002710 A1 | 4/2016 |
| GB | 2560387 A | 9/2018 |
| GB | 2566762 A | 3/2019 |
| JP | 2011253344 A | 12/2011 |
| JP | 2013196199 A | 9/2013 |
| JP | 201489626 A | 5/2014 |
| JP | 2016206782 A | 12/2016 |
| JP | 2017157216 A | 9/2017 |
| JP | 2018099317 A | 6/2018 |
| KR | 10-2018-0032400 A | 3/2018 |
| WO | 0021021 A1 | 4/2000 |
| WO | 0243352 A2 | 5/2002 |
| WO | 02059836 A3 | 5/2003 |
| WO | 2008029159 A1 | 3/2008 |
| WO | 2013041444 A1 | 3/2013 |
| WO | 2013-103912 A1 | 7/2013 |
| WO | 2014133779 A1 | 9/2014 |
| WO | 2015133699 A1 | 9/2015 |
| WO | 2016136144 A1 | 9/2016 |
| WO | 2016166508 A1 | 10/2016 |
| WO | 2017015390 A1 | 1/2017 |
| WO | 2017151241 A2 | 9/2017 |
| WO | 2017196822 A1 | 11/2017 |
| WO | 2018013438 A1 | 1/2018 |
| WO | 2018013439 A1 | 1/2018 |
| WO | 2018148613 A1 | 8/2018 |
| WO | 2018162929 A1 | 9/2018 |
| WO | 2018209156 A1 | 11/2018 |
| WO | 2018237210 A1 | 12/2018 |
| WO | 2019/032306 A1 | 2/2019 |
| WO | 2019/032307 A1 | 2/2019 |
| WO | 2019032304 A1 | 2/2019 |
| WO | 2019032305 A2 | 2/2019 |
| WO | 2020023795 | 1/2020 |
| WO | 2020023796 | 1/2020 |
| WO | 2020023798 | 1/2020 |
| WO | 2020023799 | 1/2020 |
| WO | 2020023801 | 1/2020 |
| WO | 2020023926 | 1/2020 |
| WO | 2020023930 | 1/2020 |
| WO | 2020047555 A1 | 3/2020 |
| WO | 2020214775 A1 | 10/2020 |
| WO | 2020225562 A1 | 11/2020 |

OTHER PUBLICATIONS

Harville, "Stereo person tracking with adaptive plan-view templates of height and occupancy statistics," Image and Vision Computing, vol. 22, Issue 2, Feb. 1, 2004, pp. 127-142.

Huang, et al. "Driver's view and vehicle surround estimation using omnidirectional video stream," IEEE IV2003 Intelligent Vehicles Symposium. Proceedings (Cat. No. 03TH8683), Jun. 9-11, 2003, pp. 444-449.

Rossi et al., "Tracking and Counting Moving People," IEEE Int'l Conf. on Image Processing, ICIP-94, Nov. 13-16, 1994, 5 pages.

Vincze, "Robust tracking of ellipses at frame rate," Pattern Recognition, vol. 34, Issue 2, Feb. 2001, pp. 487-498.

Black et al., "Multi View Image Surveillance and Tracking," IEEE Proceedings of the Workshop on Motion and Video Computing, 2002, pp. 1-6.

Zhang "A Flexible New Technique for Camera Calibration," IEEE Transactions on Pattern Analysis and Machine Intelligence, vol. 22, No. 11, Nov. 2000, 22pages.

Redmon et al., "You Only Look Once: Unified, Real-Time Object Detection," University of Washington, Allen Institute for Aly, Facebook AI Research, May 9, 2016, 10 pages.

PCT/US2018/043933—International Search Report and Written Opinion dated Nov. 7, 2018, 12 pages.

Grinciunaite et al. "Human Pose Estimation in Space and Time Using 3D CNN," ECCV Workshop on Brave new ideas for motion representations in videos, Oct. 2016, 7 pages.

He et al. "Identity mappings in deep residual networks" (published at https://arxiv.org/pdf/1603.05027.pdf), Jul. 25, 2016, 15 pages.

(56) References Cited

OTHER PUBLICATIONS

Redmon et al., "YOLO9000: Better, Faster, Stronger," (available at https://arxiv.org/pdf/1612.08242.pdf), Dec. 25, 2016, 9 pages.
Toshev et al. "DeepPose: Human Pose Estimation via Deep Neural Networks," IEEE Conf. on Computer Vision and Pattern Recognition, Aug. 2014, 8 pages.
PCT/US2018/043937—International Search Report and Written Opinion dated Oct. 31, 2018, 17 pages.
PCT/US2018/043934—International Search Report and Written Opinion dated Feb. 1, 2019, 15 pages.
PCT/US2018/043939—International Search Report and Written Opinion dated Jan. 2, 2019, 17 pages.
U.S. Appl. No. 16/256,358—Office Action dated Mar. 28, 2019, 7 pages.
U.S. Appl. No. 16/256,358—Response to Office Action dated Mar. 28, 2019 filed Jun. 25, 2019, 16 pages.
U.S. Appl. No. 16/256,358—Notice of Allowance dated Jul. 22, 2019, 12 pages.
TW-107126341—Application as filed on Jul. 30, 2018, 205 pages.
PCT-US2019-043519—Application as filed on Jul. 25, 2019, 54 pages.
PCT/US2019-043520—Application as Filed on Jul. 25, 2019, 54 pages.
PCT/US2019/043522—Application as filed on Jul. 25, 2019, 55 pages.
PCT/US2019/043523—Application as filed Jul. 25, 2019, 52 pages.
PCT/US2019-043526—Application as filed on Jul. 25, 2019, 39 pages.
PCT-US2019-043770—Application as filed Jul. 26, 2019, 42 pages.
PCT/US2019/043775—Application as filed on Jul. 26, 2019, 54 pages.
U.S. Appl. No. 16/519,660, filed Jul. 23, 2019, 65 pages.
U.S. Appl. No. 16/388,765, filed Apr. 18, 2019, 96 pages.
PCT/US2018/043933—International Preliminary Report on Patentability dated Feb. 20, 2020, 9 pages.
PCT/US2018/043934—International Preliminary Report on Patentability dated Feb. 20, 2020, 12 pages.
PCT/US2018/043937—International Preliminary Report on Patentability dated Feb. 20, 2020, 14 pages.
PCT/US2018/043939—International Preliminary Report on Patentability dated Feb. 20, 2020, 14 pages.
PCT/US2019-043520—International Search Report and Written Opinion dated May 8, 2020, 10 pages.
PCT/US2019/043519—International Search Report and Written Opinion dated Oct. 31, 2019, 10 pages.
PCT/US2019/043522—International Search Report and Written Opinion dated Nov. 15, 2019, 11 pages.
PCT/US2019/043523—International Search Report and Written Opinion dated Nov. 20, 2019, 18 pages.
PCT/US2019/043526—International Search Report and Written Opinion dated Nov. 18, 2019, 9 pages.
PCT/US2019/043770—International Search Report and Written Opinion dated Nov. 13, 2019, 13 pages.
PCT/US2019/043775—International Search Report and Written Opinion dated Nov. 13, 2019, 10 pages.
PCT/US2019/049388—International Search Report and Wirtten Opinion dated Dec. 20, 2019, 11 pages.
Symons, "Data Fusion Methods for Netted Sensors with Limited Communication Bandwidth", QinetiQ Ltd and University College London, 2004.
U.S. Appl. No. 16/255,573—Final Office Action dated Sep. 17, 2019, 29 pages.
U.S. Appl. No. 16/256,936—Final Office Action dated Nov. 29, 2019, 23 pages.
U.S. Office Action from U.S. Appl. No. 16/256,936 dated Jun. 1, 2020 21 pages.
U.S. Office Action in U.S. Appl. No. 16/388,772 dated May 15, 2020, 12 pages.
Ceballos, Scikit-Learn Decision Trees Explained, https://towardsdatascience.com/scikit-learn-decision-trees-explained-803f3812290d, Feb. 22, 2019, 13 pages.
PCT/US2020/028454—International Search Report and Written Opinion dated Jul. 27, 2020, 12 pages.
U.S. Appl. No. 16/256,936—Office Action dated Jun. 1, 2020, 21 pages.
U.S. Appl. No. 16/519,660—Office Action dated Aug. 20, 2020, 18 pages.
Camplani et al., "Background foreground segmentation with RGB-D Kinect data: An efficient combination of classifiers". Journal of Visual Communication and Image Representation, Academic Press, Inc., U.S., vol. 25, No. 1, Mar. 27, 2013, pp. 122-136, XP028804219, ISSN: 1047-3203, DOI: 10.1016/J.JVCIR.2013.03.009.
EP 18843163.9—Extended European Search Report dated Nov. 27, 2020, 8 pages.
EP 18843486.4—Extended European Search Report dated Dec. 8, 2020, 8 pages.
EP 18844509.2—Extended European Search Report dated Dec. 8, 2020, 8 pages.
EP-18844384.0—European Extended Search Report dated Dec. 2, 2020, 7 pages.
PCT/US2019-043520—International Preliminary Report and Written Opinion dated Feb. 4, 2021, 7 pages.
PCT/US2019/043519—International Preliminary Report on Patentability dated Feb. 4, 2021, 7 pages.
PCT/US2019/043523—International Preliminary Report on Patentability dated Feb. 4, 2021, 15 pages.
PCT/US2019/043526—International Preliminary Report on Patentability dated Feb. 4, 2021, 6 pages.
PCT/US2019/049388—International Preliminary Report on Patentability dated Mar. 11, 2021, 7 pages.
Redmon et al., "You Only Look Once: Unified, Real-Time Object Detection," University of Washington, Allen Institute for Aly, Facebook AI Research, May 9, 2016, 10 pages.
U.S. Office Action from U.S. Appl. No. 17/195,495 dated May 21, 2021, 11 pages.
U.S. Office Action from U.S. Appl. No. 16/679,035 dated Feb. 3, 2021, 12 pages.
U.S. Office Action from U.S. Appl. No. 16/842,382 dated Mar. 4, 2021, 20 pages.
U.S. Office Action in U.S. Appl. No. 16/388,765 dated Feb. 4, 2021, 9 pages.
U.S. Office Action in U.S. Appl. No. 16/519,660 dated Dec. 23, 2020, 21 pages.
U.S. Office Action in U.S. Appl. No. 16/679,027 dated Jan. 6, 2021, 12 pages.
Gkioxar et al. "R-CNNs for Pose Estimation and Action Detection," Cornell University, Computer Science, Computer Vision and Pattern Recognition, arXiv.org >cs >arXiv:1406.5212, Jun. 19, 2014, 8 pages.
Jayabalan, et al., "Dynamic Action Recognition: A convolutional neural network model for temporally organized joint location data," Cornell University, Computer Science, Dec. 20, 2016, 11 pages.
U.S. Office Action from U.S. Appl. No. 16/679,035 dated Jul. 19, 2021, 16 pages.

* cited by examiner

```
Joint = {
    (x, y) position of joint,
    joint number (one of 19 possibilities, e.g., 1 = left-ankle, 2 = right-ankle),
    confidence number (describing how confident CNN is in its prediction),
    unique integer-ID for the joint
}
```

Joints data structure 410

FIG. 4A

```
Subject = {  Key   = frame_number
             Value = {Key   = camera_id
                      Value = Assigned joints to subject
                      [
                              [x of joint1, y of joint1, z of joint1],
                              [x of joint2, y of joint2, z of joint2],
                              ..........
                              ..........
                              [x of joint18, y of joint18, z of joint18],
                      ]
                     }
          }
```

Subject Data Structure 420

FIG. 4B

```
Inventory/Log = {  Key    = Identifier (store_Id / shelf_id / subject_id)
                   Value = { Key   = SKU
                             Value = integer (quantity) + frame_id
                           }
                }
```

Inventory/Log Data Structure 500

FIG. 5

DEEP LEARNING-BASED SHOPPER STATUSES IN A CASHIER-LESS STORE

PRIORITY APPLICATIONS

This application claims the benefit of U.S. Provisional Patent Application No. 62/703,785 filed 26 Jul. 2018, which application is incorporated herein by reference; and is a continuation-in-part of U.S. patent application Ser. No. 15/945,473 filed 4 Apr. 2018 (now U.S. Pat. No. 10,474,988), which is a continuation-in-part of U.S. patent application Ser. No. 15/907,112 filed 27 Feb. 2018, (now U.S. Pat. No. 10,133,933), which is a continuation-in-part of U.S. patent application Ser. No. 15/847,796, filed 19 Dec. 2017 (now U.S. Pat. No. 10,055,853), which claims benefit of U.S. Provisional Patent Application No. 62/542,077 filed 7 Aug. 2017, which applications are incorporated herein by reference.

BACKGROUND

Field

The present invention relates to systems that track subjects in an area of real space.

Description of Related Art

Subjects in an area of real space such as a shopping store can perform various activities for example, take items from storage locations such as shelves in inventory display structures or put items back on the shelves. In the example of a shopping store the subjects can be shoppers or employees. The shoppers can require assistance in many circumstances such as requiring information about an item, picking an item from a shelf that is located at a height beyond the reach of a shopper, or a shopper may require emergency medical attention. In a cashier-less store, the shoppers can be required to check-in to an app on their mobile devices to process their shopping carts and charge their selected payment methods stored in respective accounts. To reduce losses to the store and improve quality of service, it is important to proactively understand needs of customers and quickly address those needs.

It is desirable to provide a system that can more effectively and automatically tracks shoppers at multiple locations in the shopping store and assign statuses to shoppers and generate alerts to represent respective statuses of the shoppers.

SUMMARY

A system, and method for operating a system, are provided for monitoring status of subjects in an area of real space. The system includes a display and has access to memory storing a first data set identifying locations of subjects in the area of real space over time. The system has access to a second data set identifying item put and take events in the area of real space related to the subjects in the first data set. The system has access to a third data set identifying accounts matched to the subjects in first data set. The system includes or has access to logic that assigns respective statuses to the subjects using one or more of the first data set identifying locations of subjects, the second data set identifying item put and take events and the third data set identifying accounts matched to the subjects. The user interface logic renders a map of at least part of the area of real space on the display, the map including a representation of structures in the area of real space and avatars identifying locations and movement of the subjects located on the map, and their assigned statuses.

In one embodiment, the assigned statuses are represented by color coding the avatars. The system can include logic that generates alerts, which can be sounds or other signals in addition to the avatars, as a function of the assigned statuses and locations for the subjects. The processing system can include a speaker, and the alerts can comprise audible sounds played using the speaker. The logic that assigns respective statuses to the subjects can utilize the first data set to determine distances of the subjects from an exit location in the area of real space, and at least one assigned status is a function of the determined distance.

The logic can utilize the first data set to determine speeds of movement and directions of movement of the subjects. The logic can match the directions of movements of the subjects to an exit location in the area of real space. The logic can determine respective expected times for the subjects to reach the exit location and at least one assigned status is a function of the determined respective expected times to reach the exit location.

The processing system can be linked to a camera or cameras in the area of real space. The user interface can include tools to invoke display of a video feed on the display from a camera having field of view selected using an input gesture during display of the map. The system can include logic that can detect movement of subjects indicating an event like possibility of a fallen subject which may involve medical emergency for example or other event suggesting the subject may require assistance, displays a video feed of a particular subject on a user interface in response to the detection.

The system can include a processing system that receives a plurality of sequences of frames of corresponding fields of view in the real space. The processing system can include logic that uses sequences of frames in the plurality of sequences of frames to generate the first data set identifying locations of subjects in the area of real space over time. The system can be coupled to the plurality of sensors and can include processing logic that uses the sequences of images produced by at least two sensors to identify inventory events.

The logic that uses the sequences of frames to generate the first data set includes logic to detect subjects as respective constellations of joints in the area of real space. A joint in the constellation of joints includes a location represented by positions in three dimensions of the area of real space and a timestamp.

Methods and computer program products which can be executed by computer systems are also described herein.

Functions described herein, including but not limited to assigning respective statuses to the subjects using the second data set identifying item put and take events and the third data set identifying accounts matched to the subjects and of rendering a map of at least part of the area of real space on the display including avatars identifying the respective statuses and locations of the subjects located on the map present complex problems of computer engineering, relating for example to the type of image data to be processed, what processing of the data to perform, and how to determine actions from the data with high reliability.

Other aspects and advantages of the present invention can be seen on review of the drawings, the detailed description and the claims, which follow.

BRIEF DESCRIPTION OF THE DRAWINGS

FIG. 4A shows an example data structure for storing joints information of subjects.

FIG. 4B is an example data structure for storing a subject including the information of associated joints.

FIG. 5 shows an example of a log data structure which can be used to store shopping cart of a subject or inventory items stocked on a shelf or in a shopping store.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology are described with reference to FIGS. 1-14. The system and processes are described with reference to FIG. 1, an architectural level schematic of a system in accordance with an implementation. Because FIG. 1 is an architectural diagram, certain details are omitted to improve the clarity of the description.

Figure 1:
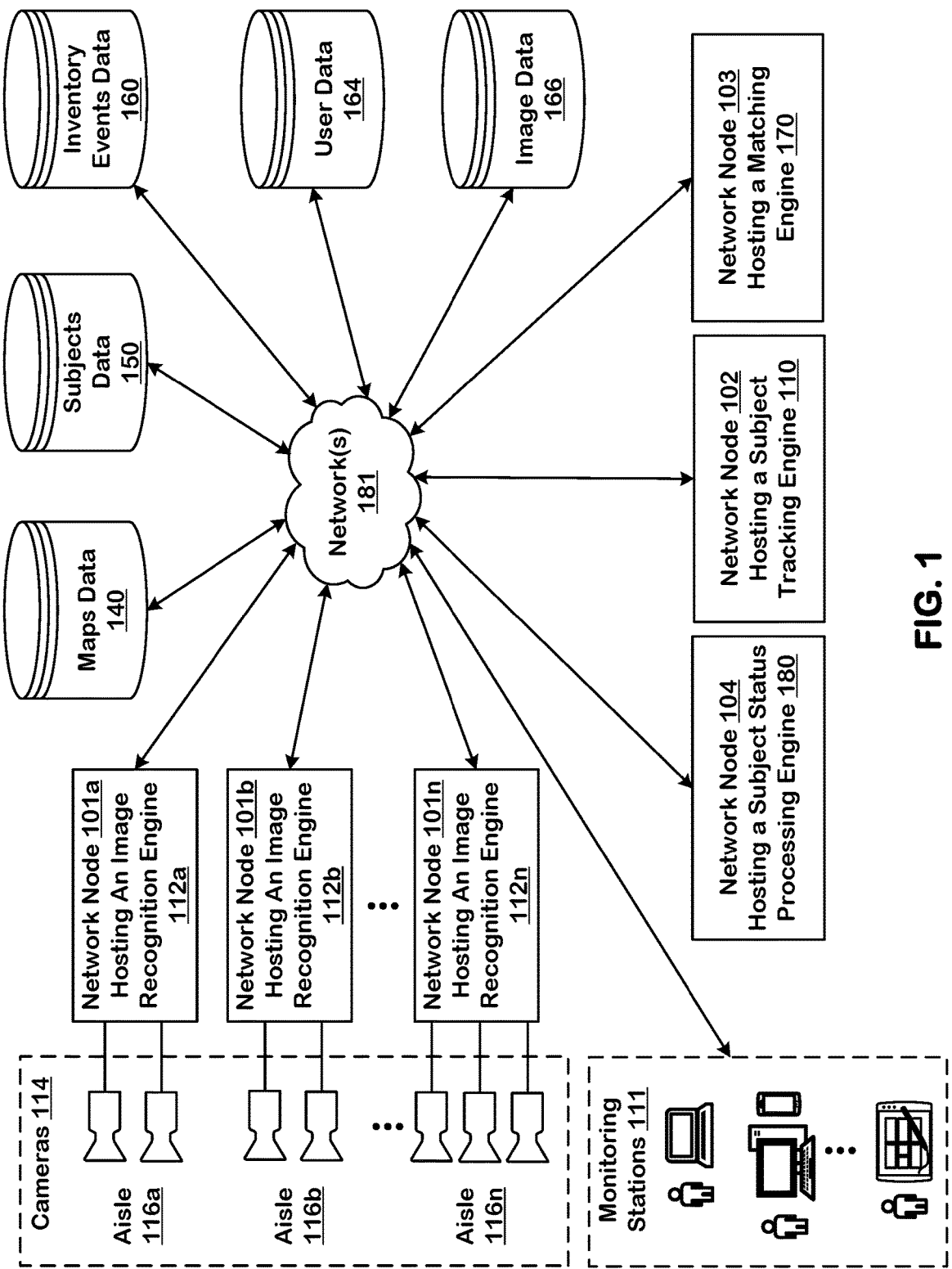
FIG. 1 illustrates an architectural level schematic of a system in which a subject status processing engine is used to determine statuses of subjects in the area of real space and displayed on user interfaces of monitoring stations.

The discussion of FIG. 1 is organized as follows. First, the elements of the system are described, followed by their interconnections. Then, the use of the elements in the system is described in greater detail.

FIG. 1 provides a block diagram level illustration of a system 100. The system 100 includes cameras 114, network nodes hosting image recognition engines 112a, 112b, and 112n, monitoring stations 111, a subject status processing engine 180 deployed in a network node 104 (or nodes) on the network, a network node 102 hosting a subject tracking engine 110, and a matching engine 170 deployed in a network node or nodes 103. The network nodes can include or have access to memory supporting subject tracking, inventory events and user accounts, including in this example a maps database 140, a subjects database 150, an inventory events database 160, a user account database 164, an image database 166, and a communication network or networks 181. The network nodes can host only one image recognition engine, or several image recognition engines.

The embodiment described here uses cameras in the visible range which can generate for example RGB color output images. In other embodiments, different kinds of sensors are used to produce sequences of images. Examples of such sensors include, ultrasound sensors, thermal sensors, Lidar, etc., which are used to produce sequences of images of corresponding fields of view in the real space. In one embodiment, sensors can be used in addition to the cameras 114. Multiple sensors can be synchronized in time with each other, so that frames are captured by the sensors at the same time, or close in time, and at the same frame capture rate. All of the embodiments described herein can include sensors other than or in addition to cameras.

As used herein, a network node is an addressable hardware device or virtual device that is attached to a network, and is capable of sending, receiving, or forwarding information over a communications channel to or from other network nodes. Examples of electronic devices which can be deployed as hardware network nodes include all varieties of computers, workstations, laptop computers, handheld computers, and smartphones. Network nodes can be implemented in a cloud-based server system. More than one virtual device configured as a network node can be implemented using a single physical device.

The databases 140, 150, 160, 164, and 166 are stored on one or more non-transitory computer readable media. The technology disclosed herein can be implemented in the context of any computer-implemented system including a data storage system or database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM InfoSphere™, Borealis™, and Yahoo! S4™. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. The term "data set" as used herein refers to a category of data rather than a manner in which the data is organized in a database system or other data storage system. For example, a table in a database may include many data sets. Also, a data set may include data stored in more than one database or at more than one data storage system. Thus in FIG. 1, the databases 140, 150, 160, 164, and 166 can be considered to be a single database, and can store many data sets.

For the sake of clarity, only three network nodes hosting image recognition engines are shown in the system 100. However, any number of network nodes hosting image recognition engines can be connected to the subject tracking engine 110 through the network(s) 181. Similarly, the image recognition engine, the subject status processing engine, the subject tracking engine, the matching engine and other processing engines described herein can execute using more than one network node in a distributed architecture.

The interconnection of the elements of system 100 will now be described. Network(s) 181 couples the network nodes 101a, 101b, and 101n, respectively, hosting image recognition engines 112a, 112b, and 112n, monitoring stations 111, the network node 104 hosting the subject status processing engine 180, the network node 102 hosting the subject tracking engine 110, the network node 103 hosting the matching engine 170, the maps database 140, the subjects database 150, the inventory events database 160, the user database 164, and the image database 166. Cameras 114 are connected to the subject tracking engine 110 through network nodes hosting image recognition engines 112a, 112b, and 112n. In one embodiment, the cameras 114 are installed in a shopping store such that sets of cameras 114 (two or more) with overlapping fields of view are positioned to capture images of real space in the store. In FIG. 1, two cameras are arranged over aisle 116a, two cameras are arranged over aisle 116b, and three cameras are arranged over aisle 116n. Cameras are installed over open spaces, aisles, and near exits and entrances to the shopping store. In such an embodiment, the cameras are configured with the goal that customers moving in the shopping store are present in the field of view of two or more cameras at any moment in time.

Cameras 114 can be synchronized in time with each other, so that images are captured at the image capture cycles at the same time, or close in time, and at the same image capture rate. The cameras 114 can send respective continuous streams of images at a predetermined rate to network nodes hosting image recognition engines 112a-112n. Images captured in all the cameras covering an area of real space at the same time, or close in time, are synchronized in the sense that the synchronized images can be identified in the processing engines as representing different views of subjects having fixed positions in the real space. For example, in one embodiment, the cameras send image frames at the rates of 30 frames per second (fps) to respective network nodes hosting image recognition engines 112a-112n. Each frame has a timestamp, identity of the camera (abbreviated as "camera_id"), and a frame identity (abbreviated as "frame_id") along with the image data. As described above other embodiments of the technology disclosed can use different types of sensors such as image sensors, ultrasound sensors, thermal sensors, Lidar, etc., Cameras are connected to respective image recognition engines. For example, in FIG. 1, the two cameras installed over the aisle 116a are connected to the network node 101a hosting an image recognition engine 112a. Likewise, the two cameras installed over aisle 116b are connected to the network node 101b hosting an image recognition engine 112b. Each image recognition engine 112a-112n hosted in a network node or nodes 101a-101n, separately processes the image frames received from one camera each in the illustrated example. In an embodiment of a subject tracking system described herein, cameras are installed overhead, so that in combination the fields of view of the cameras encompass an area of real space in which the tracking is to be performed, such as in a shopping store.

Monitoring stations 111 are connected to the subject status processing engine 180 through the network node 104. In one embodiment, each monitoring station is a computer platform enabling user input to process status of subjects in the area of real space such as a shopping store. A monitoring station 111 includes a processor and logic to present a graphical user interface GUI on a display, and to respond to user input produced by interaction with the display such as point and click or touch events, and to launch procedures linked to locations on the display or content of the display at the time of the user input. The display on the monitoring station 111 can be a touch sensitive display. The monitoring station 111 also includes one or more communication interfaces and can act as a network node in a network such at that illustrated in FIG. 1.

Attendants monitoring of the shopping store use a monitoring station 111 to connect to the subject status processing engine. Monitoring stations 111 can include a variety of computing devices such as workstations, laptop computers, handheld computers, and smartphones. In one implementation, the subject status processing engine can be deployed on premise for one shopping store. In another embodiment, the subject status processing engine can be implemented as a Software-as-a-Service (SaaS) application, a web-architected application or a cloud-delivered service.

In one embodiment, each image recognition engine 112a, 112b, and 112n is implemented as a deep learning algorithm such as a convolutional neural network (abbreviated CNN). In such an embodiment, the CNN is trained using training database. In an embodiment described herein, image recognition of subjects in the real space is based on identifying and grouping features of the subjects such as joints, recognizable in the images, where the groups of joints can be attributed to an individual subject. For this joints-based analysis, the training database has a large collection of images for each of the different types of joints for subjects. In the example embodiment of a shopping store, the subjects are the customers moving in the aisles between the shelves. In an example embodiment, during training of the CNN, the system 100 is referred to as a "training system." After training the CNN using the training database, the CNN is switched to production mode to process images of customers in the shopping store in real time.

In an example embodiment, during production, the system 100 is referred to as a runtime system (also referred to as an inference system). The CNN in each image recognition engine produces arrays of joints data structures for images in its respective stream of images. In an embodiment as described herein, an array of joints data structures is produced for each processed image, so that each image recognition engine 112a-112n produces an output stream of arrays of joints data structures. These arrays of joints data structures from cameras having overlapping fields of view are further processed to form groups of joints, and to identify such groups of joints as subjects. The subjects can be tracked by the system using a tracking identifier "tracking_id" during their presence in the area of real space. The tracked subjects can be saved in the subjects database 150.

The subject tracking engine 110, hosted on the network node 102 receives, in this example, continuous streams of arrays of joints data structures for the subjects from image recognition engines 112a-112n. The subject tracking engine 110 processes the arrays of joints data structures identified from the sequences of images received from the cameras at image capture cycles. It then translates the coordinates of the elements in the arrays of joints data structures corresponding to images in different sequences into candidate joints having coordinates in the real space. For each set of synchronized images, the combination of candidate joints identified throughout the real space can be considered, for the purposes of analogy, to be like a galaxy of candidate joints. For each succeeding point in time, movement of the candidate joints is recorded so that the galaxy changes over time. The output of the subject tracking engine 110 is used to locate subjects in the area of real space during identification intervals. One image in each of the plurality of sequences of images, produced by the cameras, is captured in each image capture cycle.

The subject tracking engine 110 uses logic to determine groups or sets of candidate joints having coordinates in real space as subjects in the real space. For the purposes of analogy, each set of candidate points is like a constellation of candidate joints at each point in time. In one embodiment, these constellations of joints are generated per identification interval as representing a located subject. Subjects are located during an identification interval using the constellation of joints. The constellations of candidate joints can move over time. A time sequence analysis of the output of the subject tracking engine 110 over a period of time, such as over multiple temporally ordered identification intervals, identifies movements of subjects in the area of real space. The system can use locations of subjects over multiple identification intervals to determine their speeds of movements and directions of movements. The system can store the subject data including unique identifiers, joints and their locations in the real space in the subject database 150.

In an example embodiment, the logic to identify sets of candidate joints (i.e. constellations) as representing a located subject comprises heuristic functions is based on physical relationships amongst joints of subjects in real space. These heuristic functions are used to locate sets of candidate joints as subjects. The sets of candidate joints comprise individual candidate joints that have relationships according to the heuristic parameters with other individual candidate joints and subsets of candidate joints in a given set that has been located, or can be located, as an individual subject.

In the example of a shopping store the customers (also referred to as subjects above) move in the aisles and in open spaces. The customers take items from inventory locations on shelves in inventory display structures. In one example of inventory display structures, shelves are arranged at different levels (or heights) from the floor and inventory items are stocked on the shelves. The shelves can be fixed to a wall or placed as freestanding shelves forming aisles in the shopping store. Other examples of inventory display structures include, pegboard shelves, magazine shelves, lazy susan shelves, warehouse shelves, and refrigerated shelving units. The inventory items can also be stocked in other types of inventory display structures such as stacking wire baskets, dump bins, etc. The customers can also put items back on the same shelves from where they were taken or on another shelf.

In one embodiment, the image analysis is anonymous, i.e., a unique tracking identifier assigned to a subject created through joints analysis does not identify personal identification details (such as names, email addresses, mailing addresses, credit card numbers, bank account numbers, driver's license number, etc.) of any specific subject in the real space. The data stored in the subjects database 150 does not include any personal identification information. The operations of the subject persistence processing engine 180 and the subject tracking engine 110 do not use any personal identification including biometric information associated with the subjects.

In one embodiment, the subjects (also referred to as tracked subjects) are identified by linking them to respective "user accounts" containing for example preferred payment method provided by the subject. When linked to a user account, a subject is characterized herein as an identified subject. Subjects are linked with items picked up on the store, and linked with a user account, for example, and upon exiting the store, an invoice can be generated and delivered to the identified subject, or a financial transaction executed on line to charge the identified subject using the payment method associated to their accounts. The identified subjects can be uniquely identified, for example, by unique account identifiers or subject identifiers, etc. In the example of a cashier-less store, as the customer completes shopping by taking items from the shelves, the system processes payment of items bought by the customer.

The system includes a matching engine 170 (hosted on the network node 103) to process signals received from mobile computing devices 120 (carried by the subjects) to match the identified subjects with user accounts. The matching can be performed by identifying locations of mobile devices executing client applications in the area of real space (e.g., the shopping store) and matching locations of mobile devices with locations of subjects, without use of personal identifying biometric information from the images.

The subject status processing engine 180 has access to the subjects database 150 storing a first data set identifying locations of subjects in the area of real space. The subject status processing engine 180 has access to the inventory events database 160 storing a second data set identifying item put and take events in the area of real space related to the subjects in the first data set. The subject status processing engine 180 also has access to user database (also referred to as user accounts database) 164 storing a third data set identifying accounts matched to the subjects in the first data set. The subject status processing engine identifies subjects on a map of the area of real space using locations of subjects in the first data set. The subject status processing engine 180 displays the subjects on the map of the area of real space on graphical user interfaces (GUI) of monitoring stations 111 connected to the subject processing engine 180 via the network(s) 181.

The subject status processing engine 180 assigns respective statuses to the subjects using item put and take events and accounts matched to the subjects. Examples of statuses assigned to the subjects can include high loss risk, requires attention, checked-in, not checked-in, employee, requires medical attention, and security risk, etc. In the example of the shopping store, subjects are customers/shoppers and employees of the shopping store. If a shopper has taken one or more items from item storage locations such as inventory display structure in the shopping store but has not checked-in and is moving toward an exit from the shopping store, the shopper can be assigned a "high loss risk" status. A shopper who is stationary in front of an inventory display structure for a period of time greater than a threshold, such as 30 seconds, may need help from a store employee. The subject status processing engine assigns a "requires attention" status to this customer.

The subject status processing engine 180 also assigns checked-in and not checked-in statuses to customers. In the example of a cashier-less store, a "checked-in" shopper has a matched user account which can include payment information as described above. The shoppers who have "not checked-in" can be approached by a store employee to help them complete the check-in process. The subject status processing engine can assign "requires medical attention" status to a subject who has fallen down on the floor. The system can also assign a "security risk" status to a subject who is identified holding a weapon inside the shopping store. The subject processing engine 180 can generate alerts using the statuses assigned to the subjects. The alerts can include representing subjects as icons with specific colors on the user interface of the client device. Other types of alerts such as audible sounds can also be generated by the system.

Figure 2A:
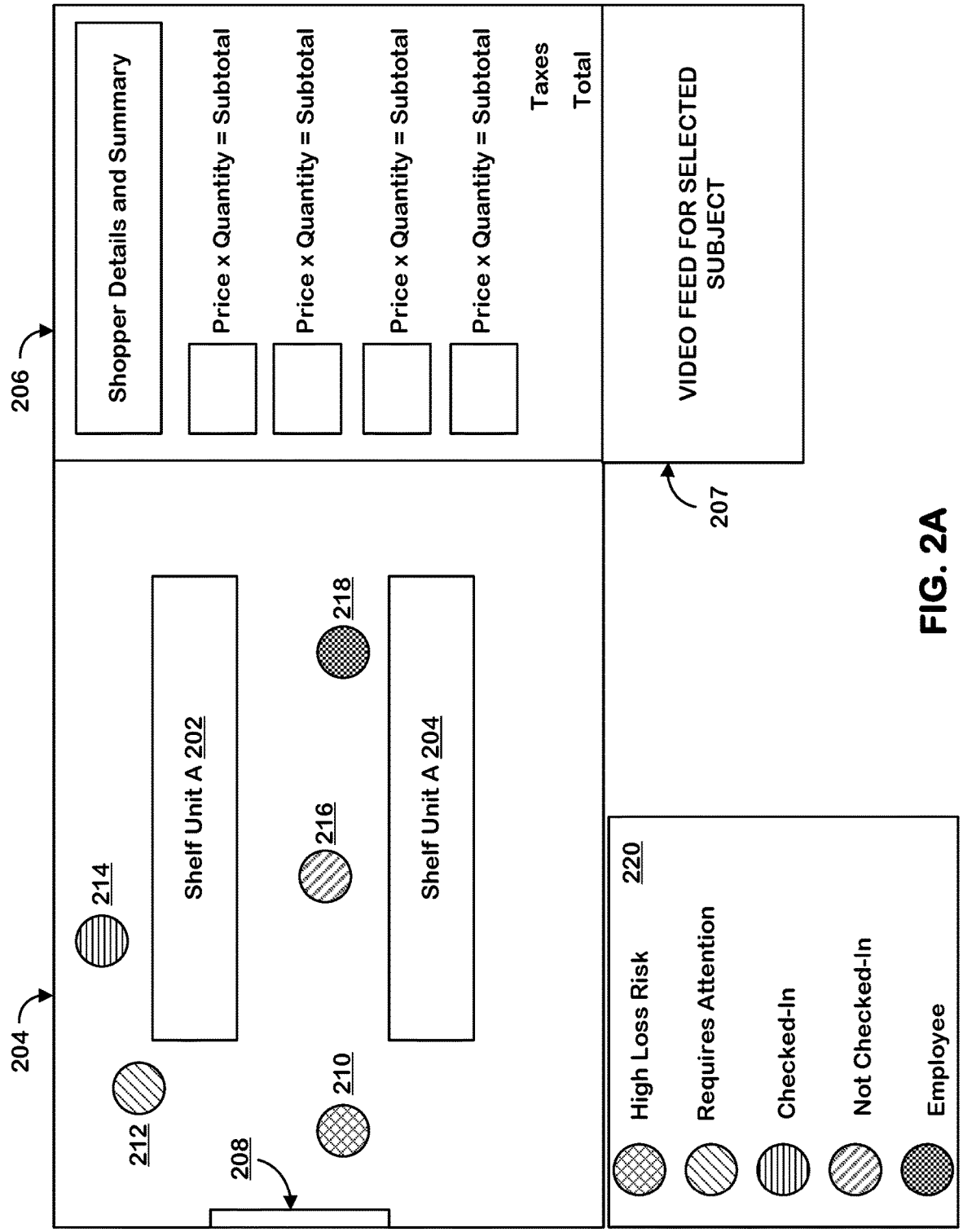
FIG. 2A is an example user interface for monitoring subjects in the area of real space.

An example graphical user interface (GUI) 200 of the monitoring stations 111 is shown in FIG. 2A. The interface includes a map area 204 of the GUI 200 which displays a map of the area of real space or a portion of the map of the area of real space including representations of structures in the area of real space. For illustration purposes, the GUI 200 displays a portion of a shopping store indicating position of two shelves: shelf unit A 202 and shelf unit B 204. The map on the GUI 200 also indicates location of an exit 208 from the shopping store. Five shoppers are displayed on the map with statuses indicated by different hatch patterns, where the hatch patterns can represent different colors on the display or other distinguishing features for the avatars. The explanation of the hatch patterns is presented in a legend 220. The statuses can be represented by different colors for each status. For example, a shopper 210 with a "high loss risk" status can be represented by a red colored avatar on the GUI 200. A shopper 212 with a "requires attention" status can be represented by a yellow colored avatar. A shopper 214 with a "checked-in" status can be represented by a green colored avatar. A shopper 216 with a "not checked-in" status can be represented by a grey colored avatar. Employee 218 of the shopping store can be represented by a blue colored avatar. The GUI 200 can display additional information about one or more shoppers in a right portion 206. For example, a shopping cart of a selected shopper, selected using an input gesture at the monitoring station, such as a screen touch or pointer click on an avatar, can be displayed with items in the shopping cart, their respective quantities and prices. Other information related to the shopping cart of the shopper such as subtotal, taxes and total amount for items in the shopping cart can also be displayed on the GUI 200. Also the user interface includes a video feed area 207, in which a video of an area in the real space in which a selected shopper is located can be displayed. The selected shopper for the video feed can be selected using an input gesture at the monitoring station, such as a screen touch or pointer click on an avatar, or can be automatically selected by monitoring logic that indicates a selected subject may need attention by the monitoring attendant.

Figure 2B:
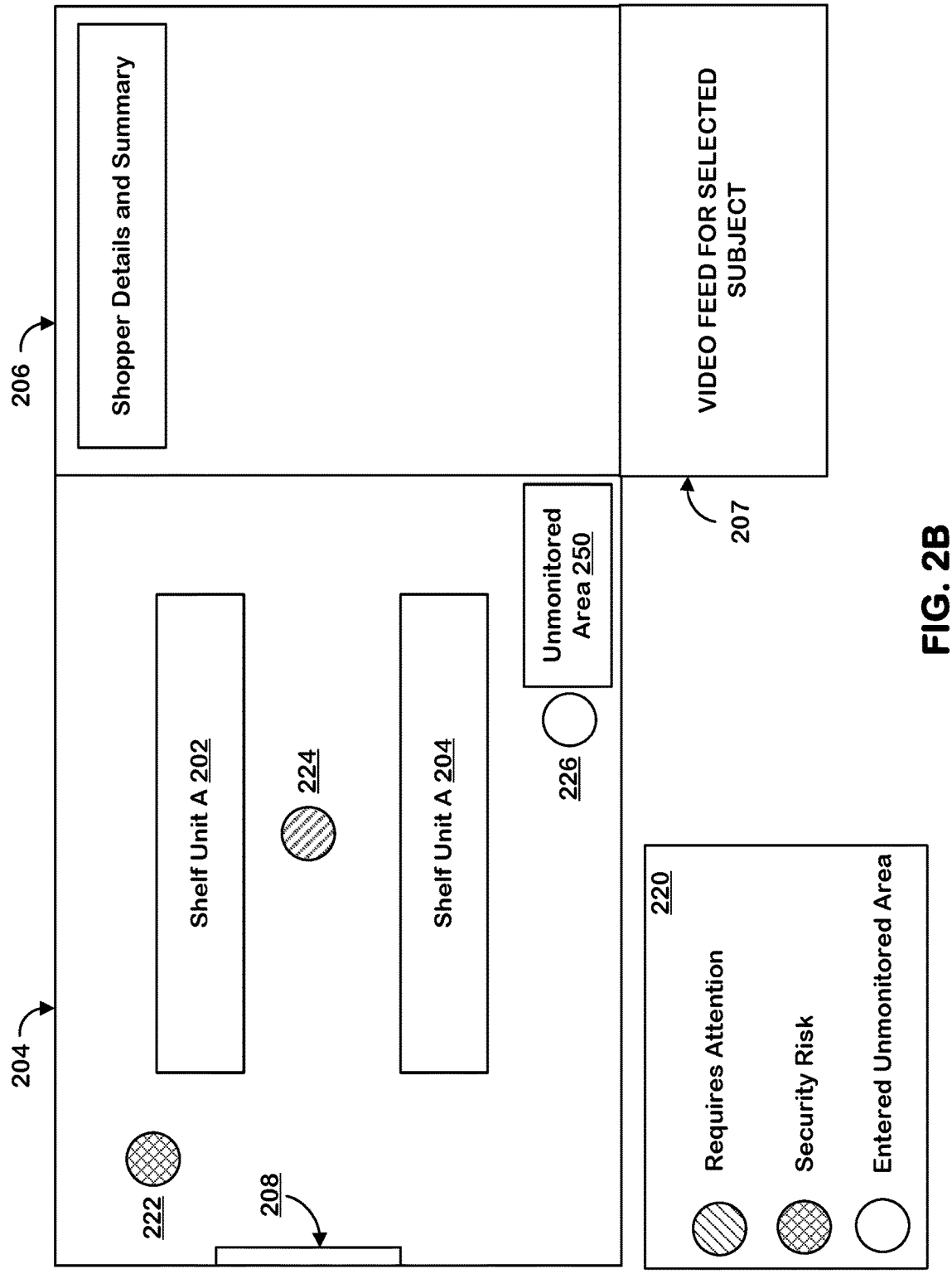
FIG. 2B is an example user interface with additional examples of statuses assigned to subjects in the area of real space.

FIG. 2B shows a user interface for a monitoring station, including a map area 204, further examples of statuses that can assigned to shoppers. The technology disclosed can determine if a shopper has fallen on the floor, e.g., by performing the joints analysis and locating all joints of a shopper within a certain height (such as 1 foot) from the floor. A shopper 224 in the GUI 200 is assigned a "requires attention" status. The shopper 224 can be displayed with a red colored avatar on the GUI 200. The technology disclosed can also provide a live video feed of the shopper on a display area 207 of the GUI 200 to help an employee looking at the monitoring station in assessing the status of the shopper. When technology disclosed determines that a shopper 222 is holding a weapon using image processing of the items in hands of the shopper, a "security risk" status is assigned to the shopper. The system can use color coded avatars to display the above mentioned example statuses. For example, the shopper 222 that required attention can be represented by a static red colored avatar and the shopper 224 who is assigned a security risk status can be represented by a flashing red colored avatar.

In one embodiment, the system can assign a status "entered unmonitored area" to a shopper who has entered an unmonitored area located inside the shopping store. An example of an unmonitored area is restrooms that are not in the field of view of cameras 114 and therefore the system does not track a subject 226 who entered the unmonitored area. The technology disclosed can display an avatar for the subject 226 just outside the location of the unmonitored area 250. The avatar can be white colored or display a symbol on the avatar indicating the shopper is inside the unmonitored area 250. Details of monitoring subjects in an area of real space that includes unmonitored area are presented in U.S. patent application Ser. No. 16/388,765, filed 18 Apr. 2019, titled, "Systems and Methods for Deep Learning-Based Subject Persistence," which is incorporated by reference as if fully set forth herein. The system can change the avatar of the shopper 226 to display one of the other statuses as presented above when the shopper 226 reappears from the unmonitored area 250 to an area of real space which is in the field of view of one or more cameras 114.

We now refer to FIG. 1 again to complete the description of the system 100. The actual communication path to the network nodes 104 hosting the subject status processing engine 180, the network node 103 hosting the matching engine 170 and the network node 102 hosting the subject tracking engine 110, through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

Camera Arrangement

The cameras 114 are arranged to track multi-joint subjects (or entities) in a three dimensional (abbreviated as 3D) real space. In the example embodiment of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

Figure 3A:
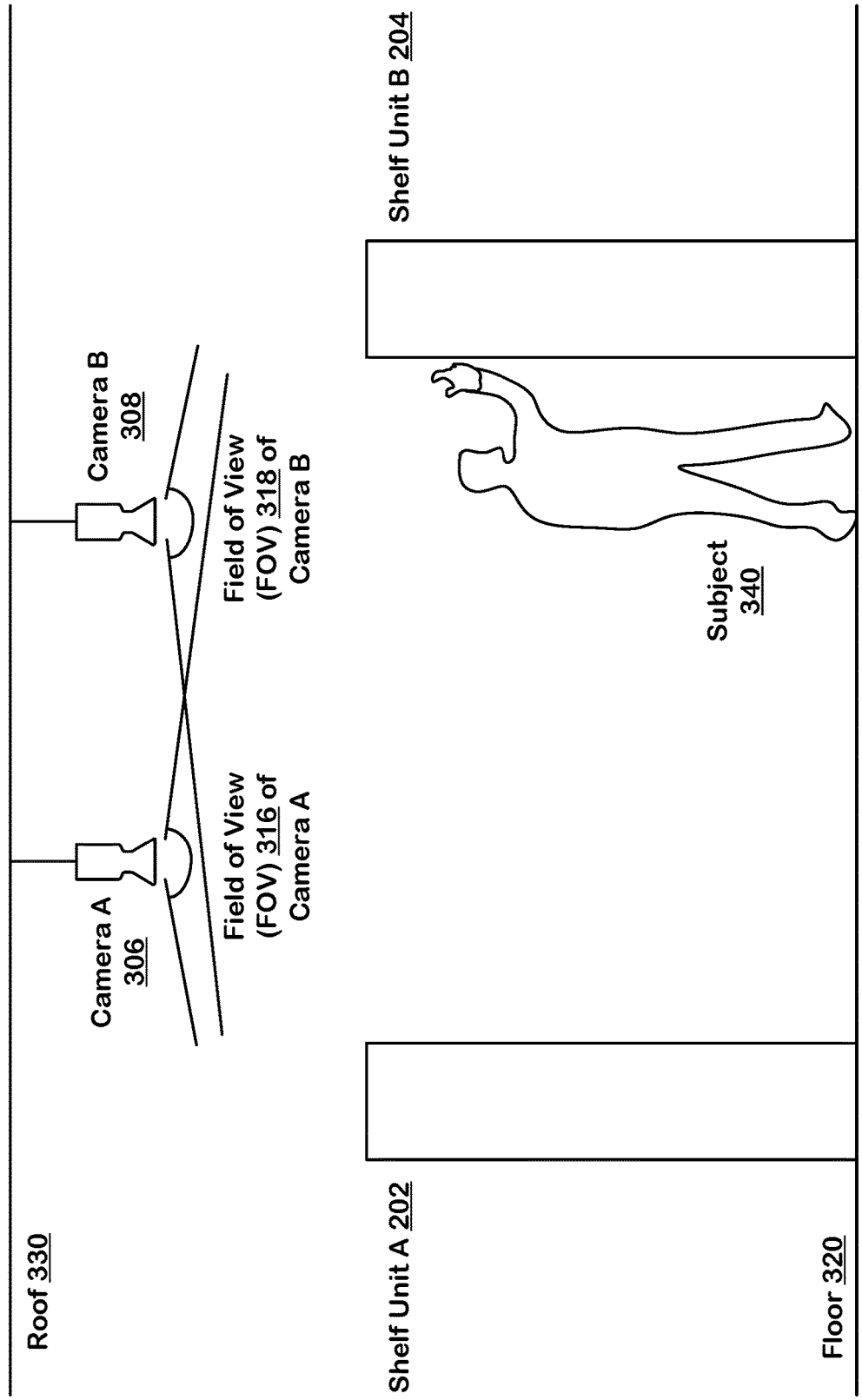
FIG. 3A is a side view of an aisle in a shopping store illustrating a subject, inventory display structures and a camera arrangement in a shopping store.

In a shopping store, the shelves and other inventory display structures can be arranged in a variety of manners, such as along the walls of the shopping store, or in rows forming aisles or a combination of the two arrangements. FIG. 3A shows an arrangement of shelf unit A 202 and shelf unit B 204, forming an aisle 116a, viewed from one end of the aisle 116a. Two cameras, camera A 306 and camera B 308 are positioned over the aisle 116a at a predetermined distance from a roof 330 and a floor 320 of the shopping store above the inventory display structures, such as shelf units A 202 and shelf unit B 204. The cameras 114 comprise cameras disposed over and having fields of view encompassing respective parts of the inventory display structures and floor area in the real space. The field of view 316 of the camera A 306 and the field of view 318 of the camera B 308 overlap with each other as shown in the FIG. 3A. The coordinates in real space of members of a set of candidate joints, identified as a subject, identify locations of the subject in the floor area.

In the example embodiment of the shopping store, the real space can include the entire floor 320 in the shopping store. Cameras 114 are placed and oriented such that areas of the floor 320 and shelves can be seen by at least two cameras. The cameras 114 also cover floor space in front of the shelf units 202 and 204. Camera angles are selected to have both steep perspective, straight down, and angled perspectives that give more full body images of the customers. In one example embodiment, the cameras 114 are configured at an eight (8) foot height or higher throughout the shopping store.

Figure 3B:
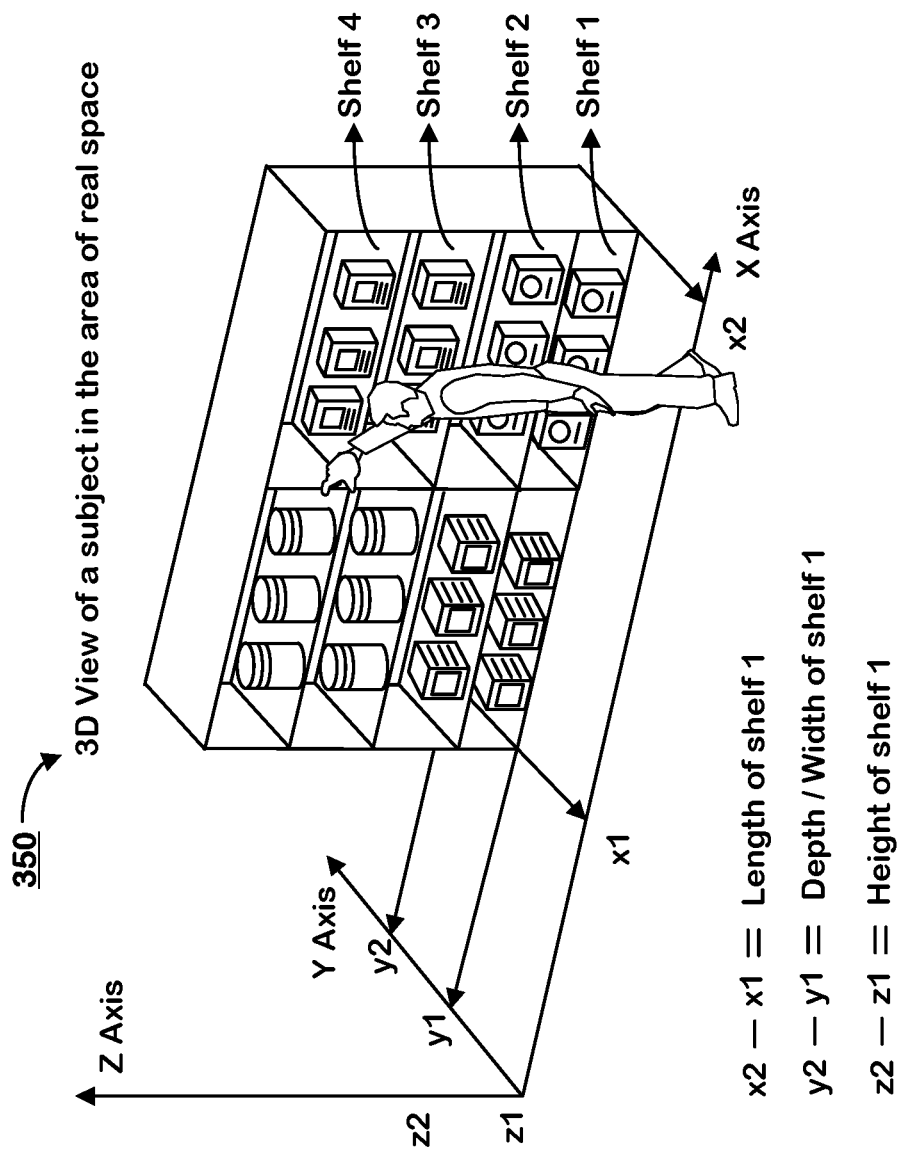
FIG. 3B is a perspective view of an inventory display structure in the aisle in FIG. 3A, illustrating a subject taking an item from a shelf in the inventory display structure.

In FIG. 3A, a subject 340 is standing by an inventory display structure shelf unit B 204, with one hand positioned close to a shelf (not visible) in the shelf unit B 204. FIG. 3B is a perspective view 350 of the shelf unit B 204 with four shelves, shelf 1, shelf 2, shelf 3, and shelf 4 positioned at different levels from the floor. The inventory items are stocked on the shelves.

Three Dimensional Scene Generation

A location in the real space is represented as a (x, y, z) point of the real space coordinate system. "x" and "y" represent positions on a two-dimensional (2D) plane which can be the floor 220 of the shopping store. The value "z" is the height of the point above the 2D plane at floor 220 in one configuration. The system combines 2D images from two or more cameras to generate the three dimensional positions of joints and inventory events (puts and takes of items from shelves) in the area of real space. This section presents a description of the process to generate 3D coordinates of joints and inventory events. The process is also referred to as 3D scene generation.

Before using the system 100 in training mode or inference mode to track the inventory items, two types of camera calibrations: internal and external, are performed. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11, November 2000.

In external calibration, the external camera parameters are calibrated in order to generate mapping parameters for translating the 2D image data into 3D coordinates in real space. In one embodiment, one multi joint subject, such as a person, is introduced into the real space. The multi-joint subject moves through the real space on a path that passes through the field of view of each of the cameras 114. At any given point in the real space, the multi-joint subject is present in the fields of view of at least two cameras forming a 3D scene. The two cameras, however, have a different view of the same 3D scene in their respective two-dimensional (2D) image planes. A feature in the 3D scene such as a left-wrist of the multi joint subject is viewed by two cameras at different positions in their respective 2D image planes.

A point correspondence is established between every pair of cameras with overlapping fields of view for a given scene. Since each camera has a different view of the same 3D scene, a point correspondence is two pixel locations (one location from each camera with overlapping field of view) that represent the projection of the same point in the 3D scene. Many point correspondences are identified for each 3D scene using the results of the image recognition engines 112a to 112n for the purposes of the external calibration. The image recognition engines identify the position of a joint as (x, y) coordinates, such as row and column numbers, of pixels in the 2D image planes of respective cameras 114. In one embodiment, a joint is one of 19 different types of joints of the multi-joint subject. As the multi-joint subject moves through the fields of view of different cameras, the tracking engine 110 receives (x, y) coordinates of each of the 19 different types of joints of the multi-joint subject used for the calibration from cameras 114 per image.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one multi-joint subject in the field of view of camera A and camera B during calibration, key joints of this multi-joint subject are identified, for example, the center of left wrist. If these key joints are visible in image frames from both camera A and camera B then it is assumed that these represent corresponding points. This process is repeated for many image frames to build up a large collection of corresponding points for all pairs of cameras with overlapping fields of view. In one embodiment, images are streamed off of all cameras at a rate of 30 FPS (frames per second) or more and a resolution of 720 pixels in full RGB (red, green, and blue) color. These images are in the form of one-dimensional arrays (also referred to as flat arrays).

The large number of images collected above for a multi joint subject is used to determine corresponding points between cameras with overlapping fields of view. Consider two cameras A and B with overlapping field of view. The plane passing through camera centers of cameras A and B and the joint location (also referred to as feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a multi joint subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the subject tracking engine 110 to identify the same joints in outputs (arrays of joint data structures) of different image recognition engines 112a to 112n, processing images of cameras 114 with overlapping fields of view. The results of the internal and external camera calibration can be stored in a calibration database.

A variety of techniques for determining the relative positions of the points in images of cameras 114 in the real space can be used. For example, Longuet-Higgins published, "A computer algorithm for reconstructing a scene from two projections" in Nature, Volume 293, 10 Sep. 1981. This paper presents computing a three-dimensional structure of a scene from a correlated pair of perspective projections when spatial relationship between the two projections is unknown. Longuet-Higgins paper presents a technique to determine the position of each camera in the real space with respect to other cameras. Additionally, their technique allows triangulation of a multi-joint subject in the real space, identifying the value of the z-coordinate (height from the floor) using images from cameras 114 with overlapping fields of view. An arbitrary point in the real space, for example, the end of a shelf unit in one corner of the real space, is designated as a (0, 0, 0) point on the (x, y, z) coordinate system of the real space.

In an embodiment of the technology, the parameters of the external calibration are stored in two data structures. The first data structure stores intrinsic parameters. The intrinsic parameters represent a projective transformation from the 3D coordinates into 2D image coordinates. The first data structure contains intrinsic parameters per camera as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.

```
{
    1: {
        K: [[x, x, x], [x, x, x], [x, x, x]],
        distortion_coefficients: [x, x, x, x, x, x, x, x]
    },
}
```

The second data structure stores per pair of cameras: a 3×3 fundamental matrix (F), a 3×3 essential matrix (E), a 3×4 projection matrix (P), a 3×3 rotation matrix (R) and a 3×1 translation vector (t). This data is used to convert points in one camera's reference frame to another camera's reference frame. For each pair of cameras, eight homography coefficients are also stored to map the plane of the floor 220 from one camera to another. A fundamental matrix is a relationship between two images of the same scene that constrains where the projection of points from the scene can occur in both images. Essential matrix is also a relationship between two images of the same scene with the condition that the cameras are calibrated. The projection matrix gives a vector space projection from 3D real space to a subspace. The rotation matrix is used to perform a rotation in Euclidean space. Translation vector "t" represents a geometric transformation that moves every point of a figure or a space by the same distance in a given direction. The homography_floor_coefficients are used to combine images of features of subjects on the floor 220 viewed by cameras with overlapping fields of views. The second data structure is shown below. Similar data is stored for all pairs of cameras. As indicated previously, the x's represents numeric floating point numbers.

```
{
    1: {
        2: {
            F: [[x, x, x], [x, x, x], [x, x, x]],
            E: [[x, x, x], [x, x, x], [x, x, x]],
            P: [[x, x, x, x], [x, x, x, x], [x, x, x, x]],
            R: [[x, x, x], [x, x, x], [x, x, x]],
            t: [x, x, x],
            homography_floor_coefficients: [x, x, x, x, x, x, x, x]
        }
    },
    ......
}
```

Joints Data Structure

The image recognition engines 112a-112n receive the sequences of images from cameras 114 and process images to generate corresponding arrays of joints data structures. The system includes processing logic that uses the sequences of images produced by the plurality of camera to track locations of a plurality of subjects (or customers in the shopping store) in the area of real space. In one embodiment, the image recognition engines 112a-112n identify one of the 19 possible joints of a subject at each element of the image, usable to identify subjects in the area who may be taking and putting inventory items. The possible joints can be grouped in two categories: foot joints and non-foot joints. The 19th type of joint classification is for all non-joint features of the subject (i.e. elements of the image not classified as a joint). In other embodiments, the image recognition engine may be configured to identify the locations of hands specifically. Also, other techniques, such as a user check-in procedure or biometric identification processes, may be deployed for the purposes of identifying the subjects and linking the subjects with detected locations of their hands as they move throughout the store.

Foot Joints:
Ankle joint (left and right)
Non-foot Joints:
Neck
Nose
Eyes (left and right)
Ears (left and right)
Shoulders (left and right)
Elbows (left and right)
Wrists (left and right)
Hip (left and right)
Knees (left and right)
Not a joint An array of joints data structures for a particular image classifies elements of the particular image by joint type, time of the particular image, and the coordinates of the elements in the particular image. In one embodiment, the image recognition engines 112a-112n are convolutional neural networks (CNN), the joint type is one of the 19 types of joints of the subjects, the time of the particular image is the timestamp of the image generated by the source camera 114 for the particular image, and the coordinates (x, y) identify the position of the element on a 2D image plane.

The output of the CNN is a matrix of confidence arrays for each image per camera. The matrix of confidence arrays is transformed into an array of joints data structures. A joints data structure 410 as shown in FIG. 4A is used to store the information of each joint. The joints data structure 410 identifies x and y positions of the element in the particular image in the 2D image space of the camera from which the image is received. A joint number identifies the type of joint identified. For example, in one embodiment, the values range from 1 to 19. A value of 1 indicates that the joint is a left ankle, a value of 2 indicates the joint is a right ankle and so on. The type of joint is selected using the confidence array for that element in the output matrix of CNN. For example, in one embodiment, if the value corresponding to the left-ankle joint is highest in the confidence array for that image element, then the value of the joint number is "1".

A confidence number indicates the degree of confidence of the CNN in predicting that joint. If the value of confidence number is high, it means the CNN is confident in its prediction. An integer-Id is assigned to the joints data structure to uniquely identify it. Following the above mapping, the output matrix of confidence arrays per image is converted into an array of joints data structures for each image. In one embodiment, the joints analysis includes performing a combination of k-nearest neighbors, mixture of Gaussians, and various image morphology transformations on each input image. The result comprises arrays of joints data structures which can be stored in the form of a bit mask in a ring buffer that maps image numbers to bit masks at each moment in time.

Subject Tracking Engine

The tracking engine 110 is configured to receive arrays of joints data structures generated by the image recognition engines 112a-112n corresponding to images in sequences of images from cameras having overlapping fields of view. The arrays of joints data structures per image are sent by image recognition engines 112a-112n to the tracking engine 110 via the network(s) 181. The tracking engine 110 translates the coordinates of the elements in the arrays of joints data structures corresponding to images in different sequences into candidate joints having coordinates in the real space. A location in the real space is covered by the field of views of two or more cameras. The tracking engine 110 comprises logic to identify sets of candidate joints having coordinates in real space (constellations of joints) as subjects in the real space. In one embodiment, the tracking engine 110 accumulates arrays of joints data structures from the image recognition engines for all the cameras at a given moment in time and stores this information as a dictionary in a subject database, to be used for identifying a constellation of candidate joints. The dictionary can be arranged in the form of key-value pairs, where keys are camera ids and values are arrays of joints data structures from the camera. In such an embodiment, this dictionary is used in heuristics-based analysis to determine candidate joints and for assignment of joints to subjects. In such an embodiment, a high-level input, processing and output of the tracking engine 110 is illustrated in table 1. Details of the logic applied by the subject tracking engine 110 to create subjects by combining candidate joints and track movement of subjects in the area of real space are presented in U.S. Pat. No. 10,055,853, issued 21 Aug. 2018, titled, "Subject Identification and Tracking Using Image Recognition Engine" which is incorporated by reference as if fully set forth herein.

TABLE 1

Inputs, processing and outputs from subject tracking engine 110 in an example embodiment.

| Inputs | Processing | Output |
| --- | --- | --- |
| Arrays of joints data structures per image and for each joints data structure Unique ID Confidence number Joint number (x, y) position in image space | Create joints dictionary Reproject joint positions in the fields of view of cameras with overlapping fields of view to candidate joints | List of identified subjects in the real space at a moment in time |

Subject Data Structure

The subject tracking engine 110 uses heuristics to connect joints of subjects identified by the image recognition engines 112a-112n. In doing so, the subject tracking engine 110 creates new subjects and updates the locations of existing subjects by updating their respective joint locations. The subject tracking engine 110 uses triangulation techniques to project the locations of joints from 2D space coordinates (x, y) to 3D real space coordinates (x, y, z). FIG. 4B shows the subject data structure 420 used to store the subject. The subject data structure 420 stores the subject related data as a key-value dictionary. The key is a "frame_id" and the value is another key-value dictionary where key is the camera_id and value is a list of 18 joints (of the subject) with their locations in the real space. The subject data is stored in the subject database. Every new subject is also assigned a unique identifier that is used to access the subject's data in the subject database.

In one embodiment, the system identifies joints of a subject and creates a skeleton of the subject. The skeleton is projected into the real space indicating the position and orientation of the subject in the real space. This is also referred to as "pose estimation" in the field of machine vision. In one embodiment, the system displays orientations and positions of subjects in the real space on a graphical user interface (GUI). In one embodiment, the subject identification and image analysis are anonymous, i.e., a unique identifier assigned to a subject created through joints analysis does not identify personal identification information of the subject as described above.

For this embodiment, the joints constellation of an identified subject, produced by time sequence analysis of the joints data structures, can be used to locate the hand of the subject. For example, the location of a wrist joint alone, or a location based on a projection of a combination of a wrist joint with an elbow joint, can be used to identify the location of hand of an identified subject.

Inventory Events

FIGS. 3A and 3B show the subject 340 taking an inventory item from a shelf in the shelf unit in the shopping store. The technology disclosed uses the sequences of images produced by at least two cameras in the plurality of cameras to find a location of an inventory event. Joints of a single subject can appear in image frames of multiple cameras in a respective image channel. In the example of a shopping store, the subjects move in the area of real space and take items from inventory locations and also put items back on the inventory locations. In one embodiment the system predicts inventory events (put or take, also referred to as plus or minus events) using a pipeline of convolutional neural networks referred to as WhatCNN and WhenCNN.

The data sets comprising subjects identified by joints in subject data structures 420 and corresponding image frames from sequences of image frames per camera are given as input to a bounding box generator. The bounding box generator implements the logic to process the data sets to specify bounding boxes which include images of hands of identified subjects in images in the sequences of images. The bounding box generator identifies locations of hands in each source image frame per camera using for example, locations of wrist joints (for respective hands) and elbow joints in the multi-joints subject data structures 420 corresponding to the respective source image frame. In one embodiment, in which the coordinates of the joints in subject data structure indicate location of joints in 3D real space coordinates, the bounding box generator maps the joint locations from 3D real space coordinates to 2D coordinates in the image frames of respective source images.

The bounding box generator creates bounding boxes for hands in image frames in a circular buffer per camera 114. In one embodiment, the bounding box is a 128 pixels (width) by 128 pixels (height) portion of the image frame with the hand located in the center of the bounding box. In other embodiments, the size of the bounding box is 64 pixels×64 pixels or 32 pixels×32 pixels. For m subjects in an image frame from a camera, there can be a maximum of 2 m hands, thus 2 m bounding boxes. However, in practice fewer than 2 m hands are visible in an image frame because of occlusions due to other subjects or other objects. In one example embodiment, the hand locations of subjects are inferred from locations of elbow and wrist joints. For example, the right hand location of a subject is extrapolated using the location of the right elbow (identified as p1) and the right wrist (identified as p2) as extrapolation_amount*(p2−p1)+p2 where extrapolation_amount equals 0.4. In another embodiment, the joints CNN 112a-112n are trained using left and right hand images. Therefore, in such an embodiment, the joints CNN 112a-112n directly identify locations of hands in image frames per camera. The hand locations per image frame are used by the bounding box generator to create a bounding box per identified hand.

WhatCNN is a convolutional neural network trained to process the specified bounding boxes in the images to generate a classification of hands of the identified subjects. One trained WhatCNN processes image frames from one camera. In the example embodiment of the shopping store, for each hand in each image frame, the WhatCNN identifies whether the hand is empty. The WhatCNN also identifies a SKU (stock keeping unit) number of the inventory item in the hand, a confidence value indicating the item in the hand is a non-SKU item (i.e. it does not belong to the shopping store inventory) and a context of the hand location in the image frame.

The outputs of WhatCNN models for all cameras 114 are processed by a single WhenCNN model for a pre-determined window of time. In the example of a shopping store, the WhenCNN performs time series analysis for both hands of subjects to identify whether a subject took a store inventory item from a shelf or put a store inventory item on a shelf. The technology disclosed uses the sequences of images produced by at least two cameras in the plurality of cameras to find a location of an inventory event. The WhenCNN executes analysis of data sets from sequences of images from at least two cameras to determine locations of inventory events in three dimensions and to identify item associated with the inventory event. A time series analysis of the output of WhenCNN per subject over a period of time is performed to identify inventory events and their time of occurrence. A non-maximum suppression (NMS) algorithm is used for this purpose. As one inventory event (i.e. put or take of an item by a subject) is detected by WhenCNN multiple times (both from the same camera and from multiple cameras), the NMS removes superfluous events for a subject. NMS is a rescoring technique comprising two main tasks: "matching loss" that penalizes superfluous detections and "joint processing" of neighbors to know if there is a better detection close-by.

The true events of takes and puts for each subject are further processed by calculating an average of the SKU logits for 30 image frames prior to the image frame with the true event. Finally, the arguments of the maxima (abbreviated arg max or argmax) are used to determine the largest value. The inventory item classified by the argmax value is used to identify the inventory item put on the shelf or taken from the shelf. The technology disclosed attributes the inventory event to a subject by assigning the inventory item associated with the inventory to a log data structure (or shopping cart data structure) of the subject. The inventory item is added to a log of SKUs (also referred to as shopping cart or basket) of respective subjects. The image frame identifier "frame_id," of the image frame which resulted in the inventory event detection is also stored with the identified SKU. The logic to attribute the inventory event to the customer matches the location of the inventory event to a location of one of the customers in the plurality of customers. For example, the image frame can be used to identify 3D position of the inventory event, represented by the position of the subject's hand in at least one point of time during the sequence that is classified as an inventory event using the subject data structure 420, which can be then used to determine the inventory location from where the item was taken from or put on. The technology disclosed uses the sequences of images produced by at least two cameras in the plurality of cameras to find a location of an inventory event and creates an inventory event data structure. In one embodiment, the inventory event data structure stores item identifier, a put or take indicator, coordinates in three dimensions of the area of real space and a time stamp. In one embodiment, the inventory events are stored in the inventory events database 160.

An example inventory data structure 500 (also referred to as a log data structure) shown in FIG. 5. This inventory data structure stores the inventory of a subject, shelf or a store as a key-value dictionary. The key is the unique identifier of a subject, shelf or a store and the value is another key value-value dictionary where key is the item identifier such as a stock keeping unit (SKU) and the value is a number identifying the quantity of item along with the "frame_id" of the image frame that resulted in the inventory event prediction. The frame identifier ("frame_id") can be used to identify the image frame which resulted in identification of an inventory event resulting in association of the inventory item with the subject, shelf, or the store. In other embodiments, a "camera_id" identifying the source camera can also be stored in combination with the frame_id in the inventory data structure 500. In one embodiment, the "frame_id" is the subject identifier because the frame has the subject's hand in the bounding box. In other embodiments, other types of identifiers can be used to identify subjects such as a "subject_id" which explicitly identifies a subject in the area of real space.

When the shelf inventory data structure is consolidated with the subject's log data structure, the shelf inventory is reduced to reflect the quantity of item taken by the customer from the shelf. If the item was put on the shelf by a customer or an employee stocking items on the shelf, the items get added to the respective inventory locations' inventory data structures. Over a period of time, this processing results in updates to the shelf inventory data structures for all inventory locations in the shopping store. Inventory data structures of inventory locations in the area of real space are consolidated to update the inventory data structure of the area of real space indicating the total number of items of each SKU in the store at that moment in time. In one embodiment, such updates are performed after each inventory event. In another embodiment, the store inventory data structures are updated periodically.

Detailed implementation of the implementations of What-CNN and WhenCNN to detect inventory events is presented in U.S. patent application Ser. No. 15/907,112, filed 27 Feb. 2018, titled, "Item Put and Take Detection Using Image Recognition" which is incorporated by reference as if fully set forth herein.

Matching Engine

The matching engine 170 includes logic to identify subjects by matching them with their respective user accounts by identifying locations of mobile devices (carried by the subjects) that are executing client applications in the area of real space. In one embodiment, the matching engine uses multiple techniques, independently or in combination, to match the tracked subjects with the user accounts. The system can be implemented without maintaining biometric identifying information about users, so that biometric information about account holders is not exposed to security and privacy concerns raised by distribution of such information.

In one embodiment, a customer (or a subject) logs in to the system using a client application executing on a personal mobile computing device upon entering the shopping store, identifying an authentic user account to be associated with the client application on the mobile device. The system then sends a "semaphore" image selected from the set of unassigned semaphore images in the image database 166 to the client application executing on the mobile device. The semaphore image is unique to the client application in the shopping store as the same image is not freed for use with another client application in the store until the system has matched the user account to a tracked subject. After that matching, the semaphore image becomes available for use again. The client application causes the mobile device to display the semaphore image, which display of the semaphore image is a signal emitted by the mobile device to be detected by the system.

The matching engine 170 uses the image recognition engines 112*a-n* or a separate image recognition engine (not shown in FIG. 1) to recognize the semaphore image and determine the location of the mobile computing device displaying the semaphore in the shopping store. The matching engine 170 matches the location of the mobile computing device to a location of a tracked subject. The matching engine 170 then links the subject (stored in the subject database 150) to the user account (stored in the user database 164) linked to the client application for the duration in which the subject is present in the shopping store. No biometric identifying information is used for identifying the subject by matching the subject with the user account, and none is stored in support of this process. That is, there is no information in the sequences of images used to compare with stored biometric information for the purposes of matching the tracked subjects with user accounts in support of this process.

In other embodiments, the matching engine 170 uses other signals in the alternative or in combination from the mobile computing devices to link the subjects to user accounts. Examples of such signals include a service location signal identifying the position of the mobile computing device in the area of the real space, speed and orientation of the mobile computing device obtained from the accelerometer and compass of the mobile computing device, etc.

In some embodiments, though embodiments are provided that do not maintain any biometric information about account holders, the system can use biometric information to assist matching a not-yet-linked tracked subject to a user account. For example, in one embodiment, the system stores "hair color" of the customer in his or her user account record. During the matching process, the system might use for example hair color of subjects as an additional input to disambiguate and match the tracked subject to a user account. If the user has red colored hair and there is only one subject with red colored hair in the area of real space or in close proximity of the mobile computing device, then the system might select the subject with red hair color to match the user account.

The following description provides examples of algorithms for identifying tracked subjects by matching them to their respective user accounts. In the case of a cashier-less store the subjects move in the aisles and open spaces of the store and take items from shelves. The technology disclosed associates the items taken by tracked subjects to their respective shopping cart or log data structures. The technology disclosed uses one of the following check-in techniques to identify tracked subjects and match them to their respective user accounts. The user accounts have information such as preferred payment method for the identified subject. The technology disclosed can automatically charge the preferred payment method in the user account in response to identified subject leaving the shopping store.

Figure 6:
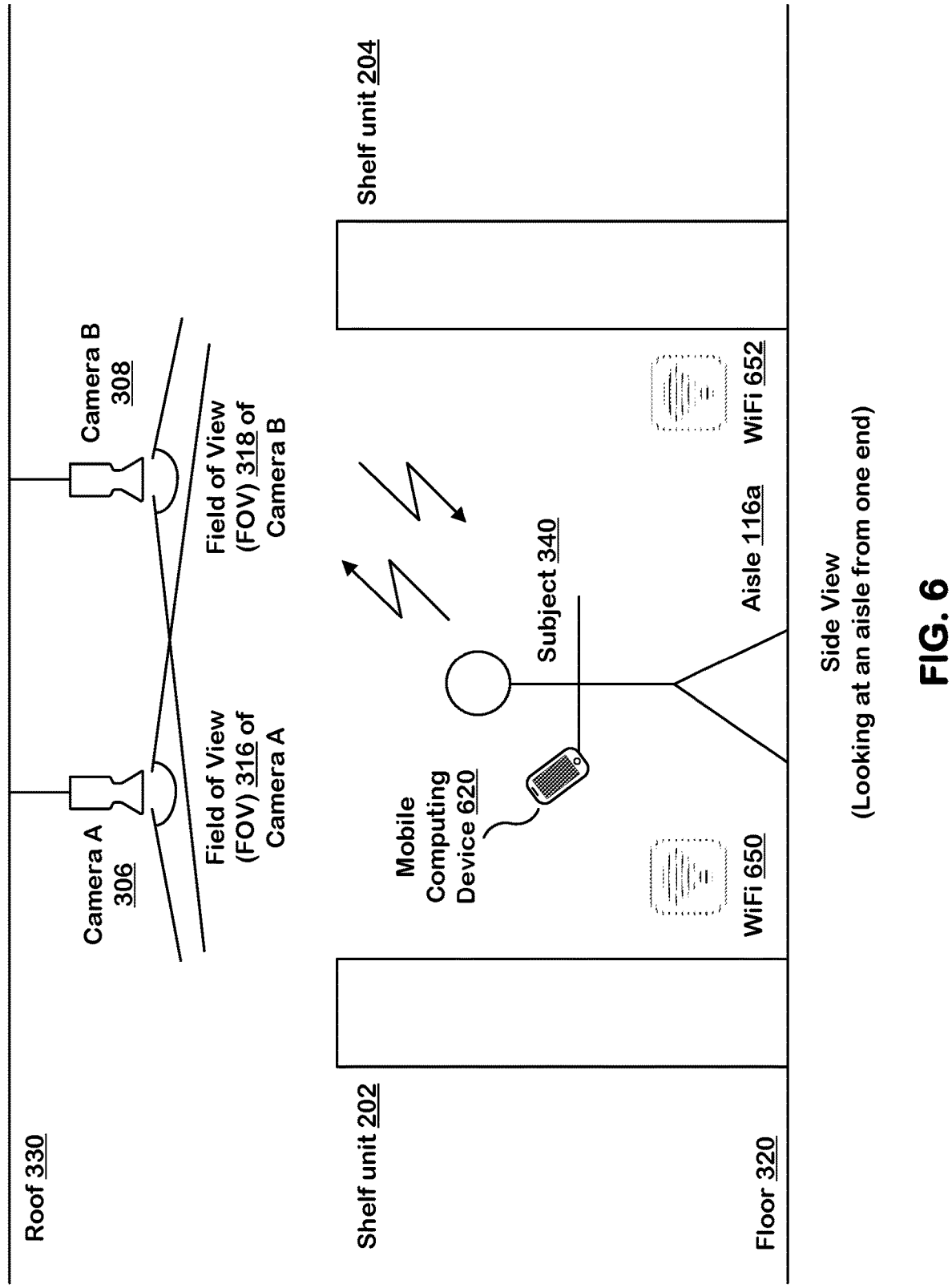
FIG. 6 is a side view of an aisle in a shopping store illustrating a subject with a mobile computing device and a camera arrangement.

In a shopping store, the shelves and other inventory display structures can be arranged in a variety of manners, such as along the walls of the shopping store, or in rows forming aisles or a combination of the two arrangements. FIG. 6 shows an arrangement of shelves, forming an aisle 116*a*, viewed from one end of the aisle 116*a*. Two cameras, camera A 306 and camera B 308 are positioned over the aisle 116*a* at a predetermined distance from a roof 330 and a floor 320 of the shopping store above the inventory display structures, such as shelves. The cameras 114 comprise cameras disposed over and having fields of view encompassing respective parts of the inventory display structures and floor area in the real space. The coordinates in real space of members of a set of candidate joints, located as a subject, identify locations of the subject in the floor area. In FIG. 6, the subject 340 is holding a mobile computing device 620 and standing on the floor 320 in the aisle 116a. The mobile computing device can send and receive signals through the wireless network(s) 181. In one example, the mobile computing device 620 communicates through a wireless network using for example a Wi-Fi protocol, or other wireless protocols like Bluetooth, ultra-wideband, and ZigBee, through wireless access points (WAP) 650 and 652.

In the example embodiment of the shopping store, the real space can include the entire floor 320 in the shopping store from which inventory can be accessed. Cameras 114 are placed and oriented such that areas of the floor 320 and shelves can be seen by at least two cameras. The cameras 114 also cover at least part of the shelf units 202 and 204 and floor space in front of the shelf units 202 and 204. Camera angles are selected to have both steep perspective, straight down, and angled perspectives that give more full body images of the customers. In one example embodiment, the cameras 114 are configured at an eight (8) foot height or higher throughout the shopping store.

In FIG. 6, the cameras 306 and 308 have overlapping fields of view, covering the space between the shelf unit 202 and the shelf unit 204 with overlapping fields of view 316 and 318, respectively. A location in the real space is represented as a (x, y, z) point of the real space coordinate system. "x" and "y" represent positions on a two-dimensional (2D) plane which can be the floor 320 of the shopping store. The value "z" is the height of the point above the 2D plane at floor 320 in one configuration.

Figure 7:
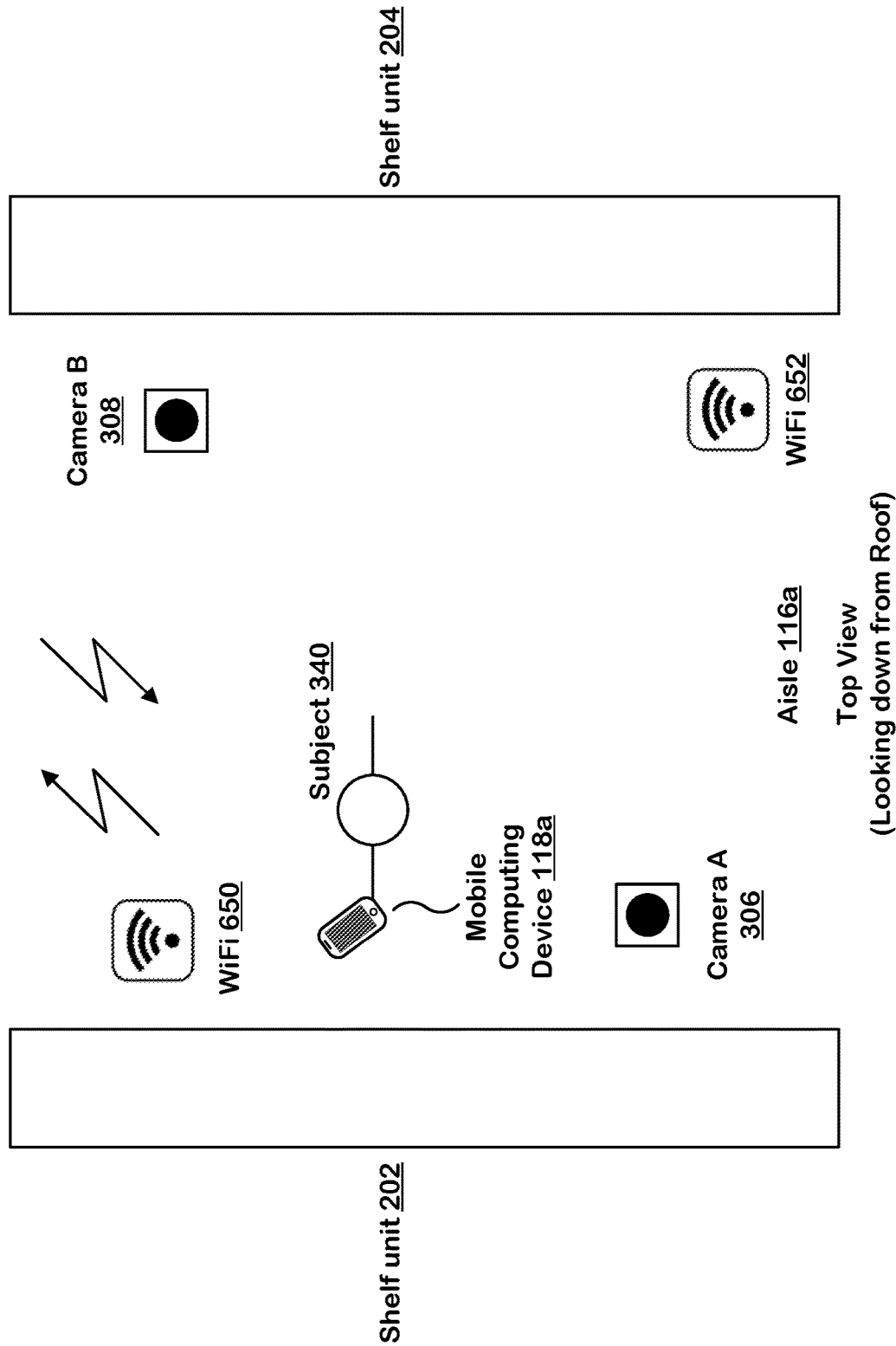
FIG. 7 is a top view of the aisle of FIG. 6 in a shopping store illustrating the subject with the mobile computing device and the camera arrangement.

FIG. 7 illustrates the aisle 116a of FIG. 6 viewed from the top, further showing an example arrangement of the positions of cameras 306 and 308 over the aisle 116a. The cameras 306 and 308 are positioned closer to opposite ends of the aisle 116a. The camera A 306 is positioned at a predetermined distance from the shelf unit 202 and the camera B 308 is positioned at a predetermined distance from the shelf unit 204. In another embodiment, in which more than two cameras are positioned over an aisle, the cameras are positioned at equal distances from each other. In such an embodiment, two cameras are positioned close to the opposite ends and a third camera is positioned in the middle of the aisle. It is understood that a number of different camera arrangements are possible.

The flowcharts in FIGS. 8 to 11C present process steps of four techniques usable alone or in combination by the matching engine 170.

Semaphore Images

Figure 8:
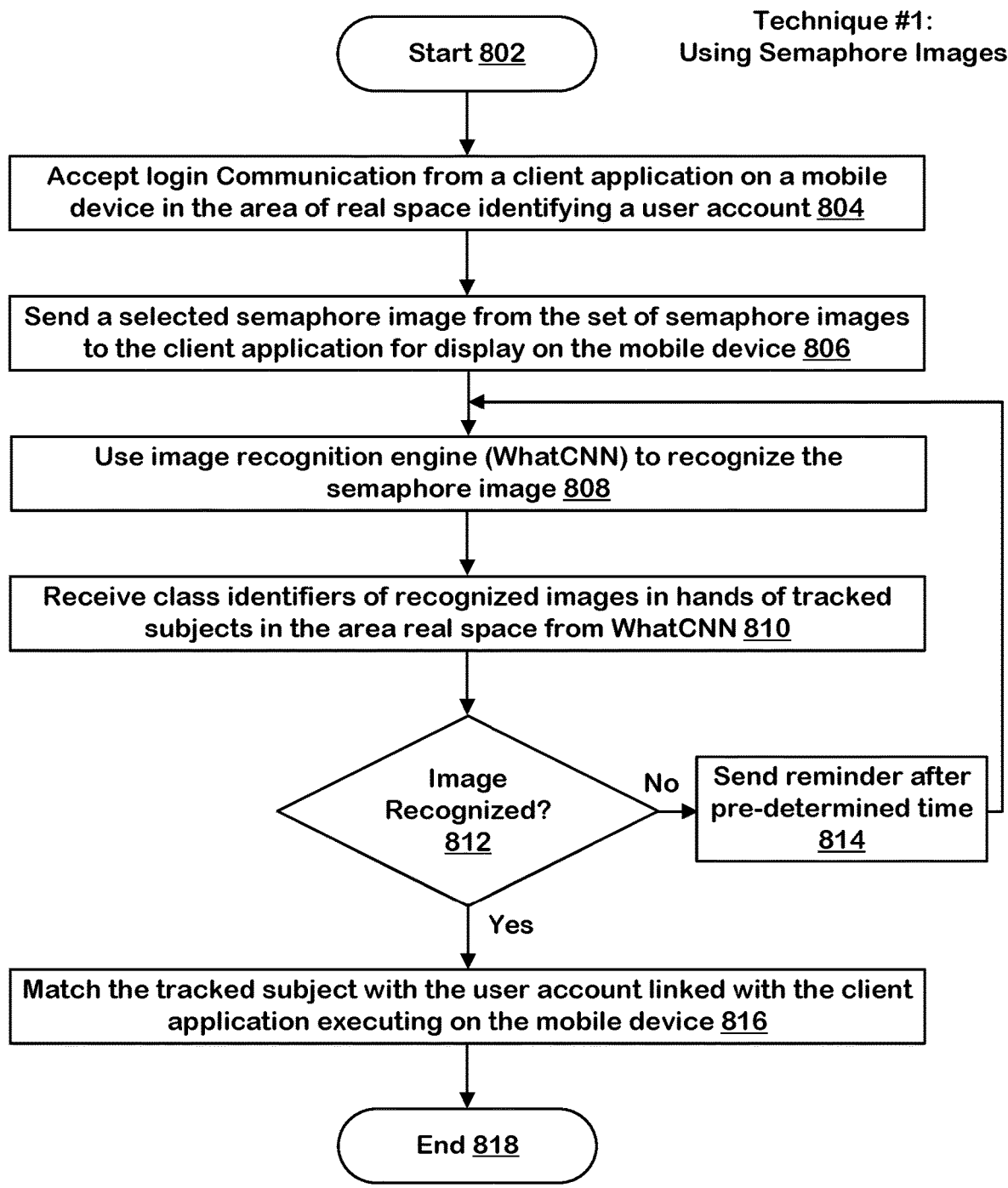
FIG. 8 is a flowchart showing process steps for identifying a subject by matching the subject to a user account using a semaphore image displayed on a mobile computing device.

FIG. 8 is a flowchart 800 presenting process steps for a first technique to identify subject by matching tracked subjects in the area of real space with their respective user accounts. In the example of a shopping store, the subjects are customers (or shoppers) moving in the store in aisles between shelves and other open spaces. The process starts at step 802. As a subject enters the area of real space, the subject opens a client application on a mobile computing device and attempts to login. The system verifies the user credentials at step 804 (for example, by querying the user database 164) and accepts login communication from the client application to associate an authenticated user account with the mobile computing device. The system determines that the user account of the client application is not yet linked to a tracked subject. The system sends a semaphore image to the client application for display on the mobile computing device at step 806. Examples of semaphore images include various shapes of solid colors such as a red rectangle or a pink elephant, etc. A variety of images can be used as semaphores, preferably suited for high confidence recognition by the image recognition engine. Each semaphore image can have a unique identifier. The processing system includes logic to accept login communications from a client application on a mobile device identifying a user account before matching the user account to a tracked subject in the area of real space, and after accepting login communications sends a selected semaphore image from the set of semaphore images to the client application on the mobile device.

In one embodiment, the system selects an available semaphore image from the image database 166 for sending to the client application. After sending the semaphore image to the client application, the system changes a status of the semaphore image in the image database 166 as "assigned" so that this image is not assigned to any other client application. The status of the image remains as "assigned" until the process to match the tracked subject to the mobile computing device is complete. After matching is complete, the status can be changed to "available." This allows for rotating use of a small set of semaphores in a given system, simplifying the image recognition problem.

The client application receives the semaphore image and displays it on the mobile computing device. In one embodiment, the client application also increases the brightness of the display to increase the image visibility. The image is captured by one or more cameras 114 and sent to an image processing engine, referred to as WhatCNN. The system uses WhatCNN at step 808 to recognize the semaphore images displayed on the mobile computing device. In one embodiment, WhatCNN is a convolutional neural network trained to process the specified bounding boxes in the images to generate a classification of hands of the tracked subjects. One trained WhatCNN processes image frames from one camera. In the example embodiment of the shopping store, for each hand joint in each image frame, the WhatCNN identifies whether the hand joint is empty. The WhatCNN also identifies a semaphore image identifier (in the image database 166) or an SKU (stock keeping unit) number of the inventory item in the hand joint, a confidence value indicating the item in the hand joint is a non-SKU item (i.e. it does not belong to the shopping store inventory) and a context of the hand joint location in the image frame.

As mentioned above, two or more cameras with overlapping fields of view capture images of subjects in real space. Joints of a single subject can appear in image frames of multiple cameras in a respective image channel. A WhatCNN model per camera identifies semaphore images (displayed on mobile computing devices) in hands (represented by hand joints) of subjects. A coordination logic combines the outputs of WhatCNN models into a consolidated data structure listing identifiers of semaphore images in left hand (referred to as left_hand_classid) and right hand (right_hand_classid) of tracked subjects (step 810). The system stores this information in a dictionary mapping tracking_id to left_hand_classid and right_hand_classid along with a timestamp, including locations of the joints in real space. The details of WhatCNN are presented in U.S. patent application Ser. No. 15/907,112, filed 27 Feb. 2018 filed 27 Feb. 2018, (now issued U.S. Pat. No. 10,133,933) issued on 20 Nov. 2018, titled, "Item Put and Take Detection Using Image Recognition" which is incorporated herein by reference as if fully set forth herein.

At step 812, the system checks if the semaphore image sent to the client application is recognized by the WhatCNN by iterating the output of the WhatCNN models for both hands of all tracked subjects. If the semaphore image is not recognized, the system sends a reminder at a step 814 to the client application to display the semaphore image on the mobile computing device and repeats process steps 808 to 812. Otherwise, if the semaphore image is recognized by WhatCNN, the system matches a user_account (from the user database 164) associated with the client application to tracking_id (from the subject database 150) of the tracked subject holding the mobile computing device (step 816). In one embodiment, the system maintains this mapping (tracking_id-user_account) until the subject is present in the area of real space. In one implementation, the system assigns a unique subject identifier (e.g., referred to by subject_id) to the identified subject and stores a mapping of the subject identifier to the tuple tracking_id-user_account. The process ends at step 818.

Service Location

Figure 9:
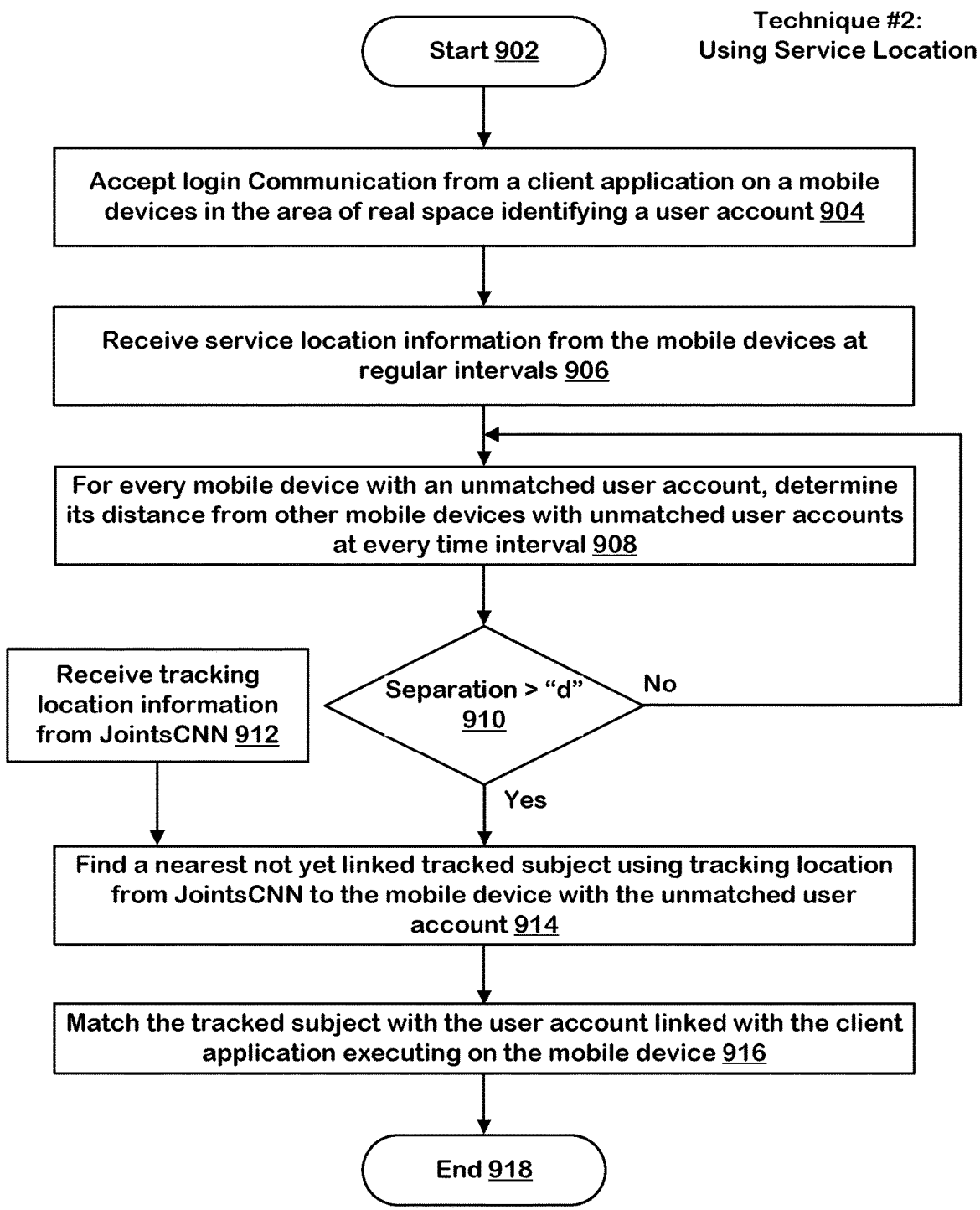
FIG. 9 is a flowchart showing process steps for identifying a subject by matching a subject to a user account using service location of a mobile computing device.

The flowchart 900 in FIG. 9 presents process steps for a second technique for identifying subjects by matching tracked subjects with user accounts. This technique uses radio signals emitted by the mobile devices indicating location of the mobile devices. The process starts at step 902, the system accepts login communication from a client application on a mobile computing device as described above in step 904 to link an authenticated user account to the mobile computing device. At step 906, the system receives service location information from the mobile devices in the area of real space at regular intervals. In one embodiment, latitude and longitude coordinates of the mobile computing device emitted from a global positioning system (GPS) receiver of the mobile computing device are used by the system to determine the location. In one embodiment, the service location of the mobile computing device obtained from GPS coordinates has an accuracy between 1 to 3 meters. In another embodiment, the service location of a mobile computing device obtained from GPS coordinates has an accuracy between 1 to 5 meters.

Other techniques can be used in combination with the above technique or independently to determine the service location of the mobile computing device. Examples of such techniques include using signal strengths from different wireless access points (WAP) such as 650 and 652 shown in FIGS. 6 and 7 as an indication of how far the mobile computing device is from respective access points. The system then uses known locations of wireless access points (WAP) 650 and 652 to triangulate and determine the position of the mobile computing device in the area of real space. Other types of signals (such as Bluetooth, ultra-wideband, and ZigBee) emitted by the mobile computing devices can also be used to determine a service location of the mobile computing device.

The system monitors the service locations of mobile devices with client applications that are not yet linked to a tracked subject at step 908 at regular intervals such as every second. At step 908, the system determines the distance of a mobile computing device with an unmatched user account from all other mobile computing devices with unmatched user accounts. The system compares this distance with a pre-determined threshold distance "d" such as 3 meters. If the mobile computing device is away from all other mobile devices with unmatched user accounts by at least "d" distance (step 910), the system determines a nearest not yet linked subject to the mobile computing device (step 914). The location of the tracked subject is obtained from the output of the JointsCNN at step 912. In one embodiment the location of the subject obtained from the JointsCNN is more accurate than the service location of the mobile computing device. At step 916, the system performs the same process as described above in flowchart 900 to match the tracking_id of the tracked subject with the user_account of the client application. The process ends at a step 918.

No biometric identifying information is used for matching the tracked subject with the user account, and none is stored in support of this process. That is, there is no information in the sequences of images used to compare with stored biometric information for the purposes of matching the tracked subjects with user account in support of this process. Thus, this logic to match the tracked subjects with user accounts operates without use of personal identifying biometric information associated with the user accounts.

Speed and Orientation

Figure 10:
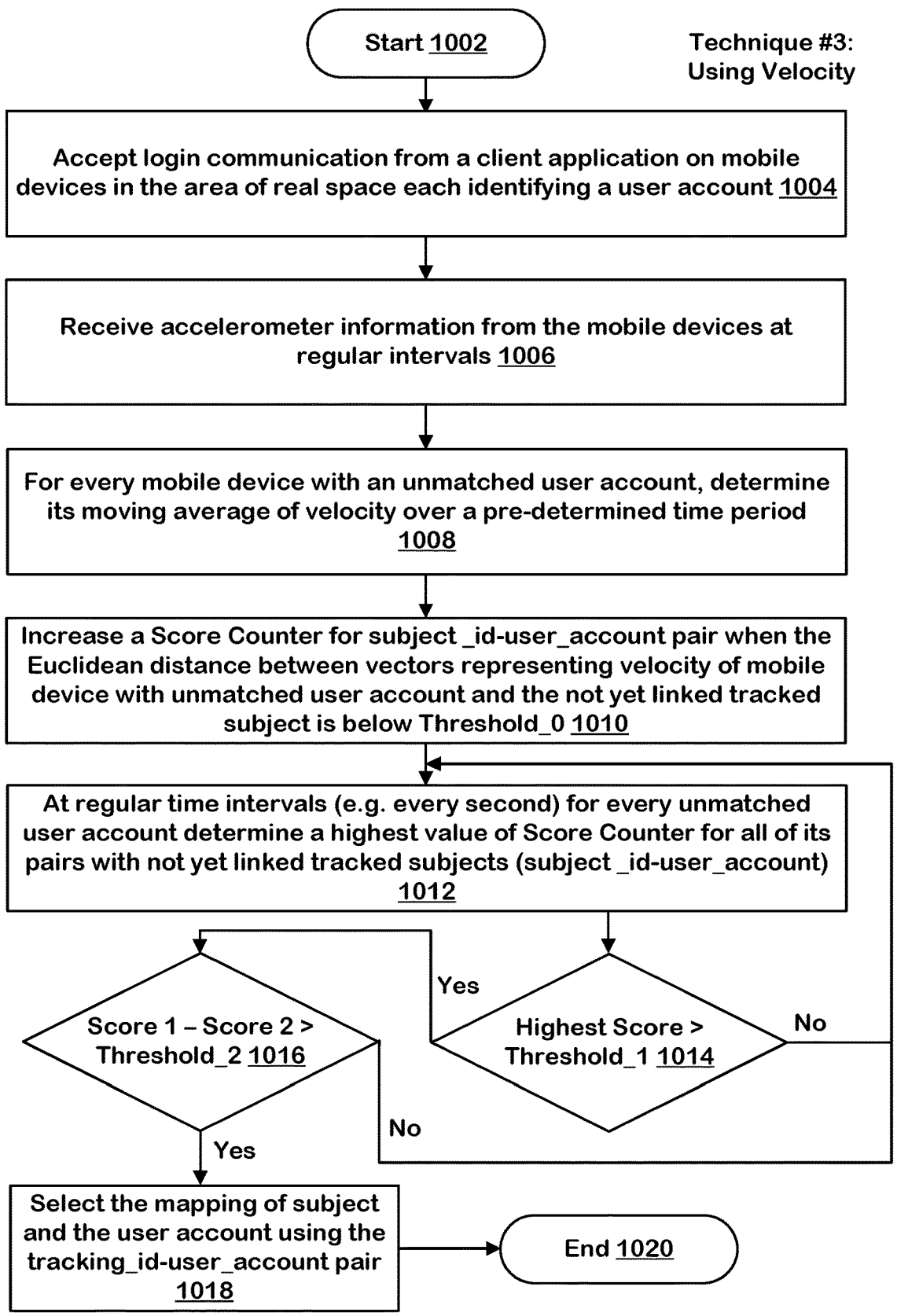
FIG. 10 is a flowchart showing process steps for identifying a subject by matching a subject to a user account using velocity of subjects and a mobile computing device.

The flowchart 1000 in FIG. 10 presents process steps for a third technique to identify subject by matching tracked subjects with user accounts. This technique uses signals emitted by an accelerometer of the mobile computing devices to match tracked subjects with client applications. The process starts at step 1002. The process starts at step 1004 to accept login communication from the client application as described above in the first and second techniques. At step 1006, the system receives signals emitted from the mobile computing devices carrying data from accelerometers on the mobile computing devices in the area of real space, which can be sent at regular intervals. At a step 1008, the system calculates an average velocity of all mobile computing devices with unmatched user accounts.

The accelerometers provide acceleration of mobile computing devices along the three axes (x, y, z). In one embodiment, the velocity is calculated by taking the accelerations values at small time intervals (e.g., at every 10 milliseconds) to calculate the current velocity at time "t" i.e., $v_t = v_0 + a_t$, where $v_0$ is initial velocity. In one embodiment, the $v_0$ is initialized as "0" and subsequently, for every time t+1, $v_t$ becomes $v_0$. The velocities along the three axes are then combined to determine an overall velocity of the mobile computing device at time "t." Finally at step 1008, the system calculates moving averages of velocities of all mobile computing devices over a larger period of time such as 3 seconds which is long enough for the walking gait of an average person, or over longer periods of time.

At step 1010, the system calculates Euclidean distance (also referred to as L2 norm) between velocities of all pairs of mobile computing devices with unmatched client applications to not yet linked tracked subjects. The velocities of subjects are derived from changes in positions of their joints with respect to time, obtained from joints analysis and stored in respective subject data structures 420 with timestamps. In one embodiment, a location of center of mass of each subject is determined using the joints analysis. The velocity, or other derivative, of the center of mass location data of the subject is used for comparison with velocities of mobile computing devices. For each tracking_id-user_account pair, if the value of the Euclidean distance between their respective velocities is less than a threshold_0, a score_counter for the tracking_id-user_account pair is incremented. The above process is performed at regular time intervals, thus updating the score_counter for each tracking_id-user_account pair.

At regular time intervals (e.g., every one second), the system compares the score_counter values for pairs of every unmatched user_account with every not yet linked tracked subject (step 1012). If the highest score is greater than threshold_1 (step 1014), the system calculates the difference between the highest score and the second highest score (for pair of same user account with a different subject) at step 1016. If the difference is greater than threshold_2, the system selects the mapping of user_account to the tracked subject at step 1018 and follows the same process as described above in step 1016. The process ends at a step 1020.

In another embodiment, when JointsCNN recognizes a hand holding a mobile computing device, the velocity of the hand (of the tracked subject) holding the mobile computing device is used in above process instead of using the velocity of the center of mass of the subject. This improves performance of the matching algorithm. To determine values of the thresholds (threshold_0, threshold_1, threshold_2), the system uses training data with labels assigned to the images. During training, various combinations of the threshold values are used and the output of the algorithm is matched with ground truth labels of images to determine its performance. The values of thresholds that result in best overall assignment accuracy are selected for use in production (or inference).

No biometric identifying information is used for matching the tracked subject with the user account, and none is stored in support of this process. That is, there is no information in the sequences of images used to compare with stored biometric information for the purposes of matching the tracked subjects with user accounts in support of this process. Thus, this logic to match the tracked subjects with user accounts operates without use of personal identifying biometric information associated with the user accounts.

Network Ensemble

Figure 11A:
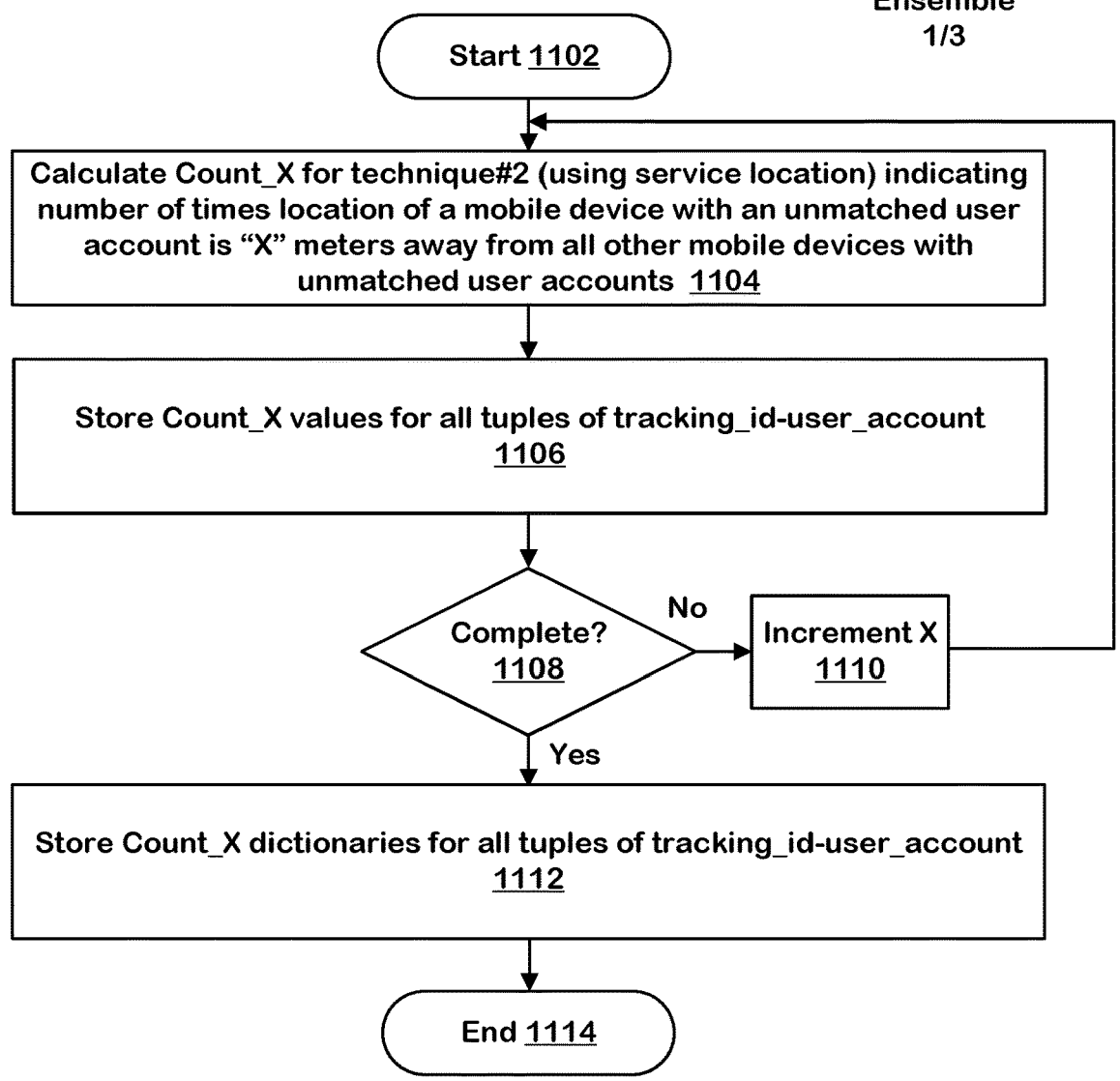
FIG. 11A is a flowchart showing a first part of process steps for matching a subject to a user account using a network ensemble.
Figure 11B:
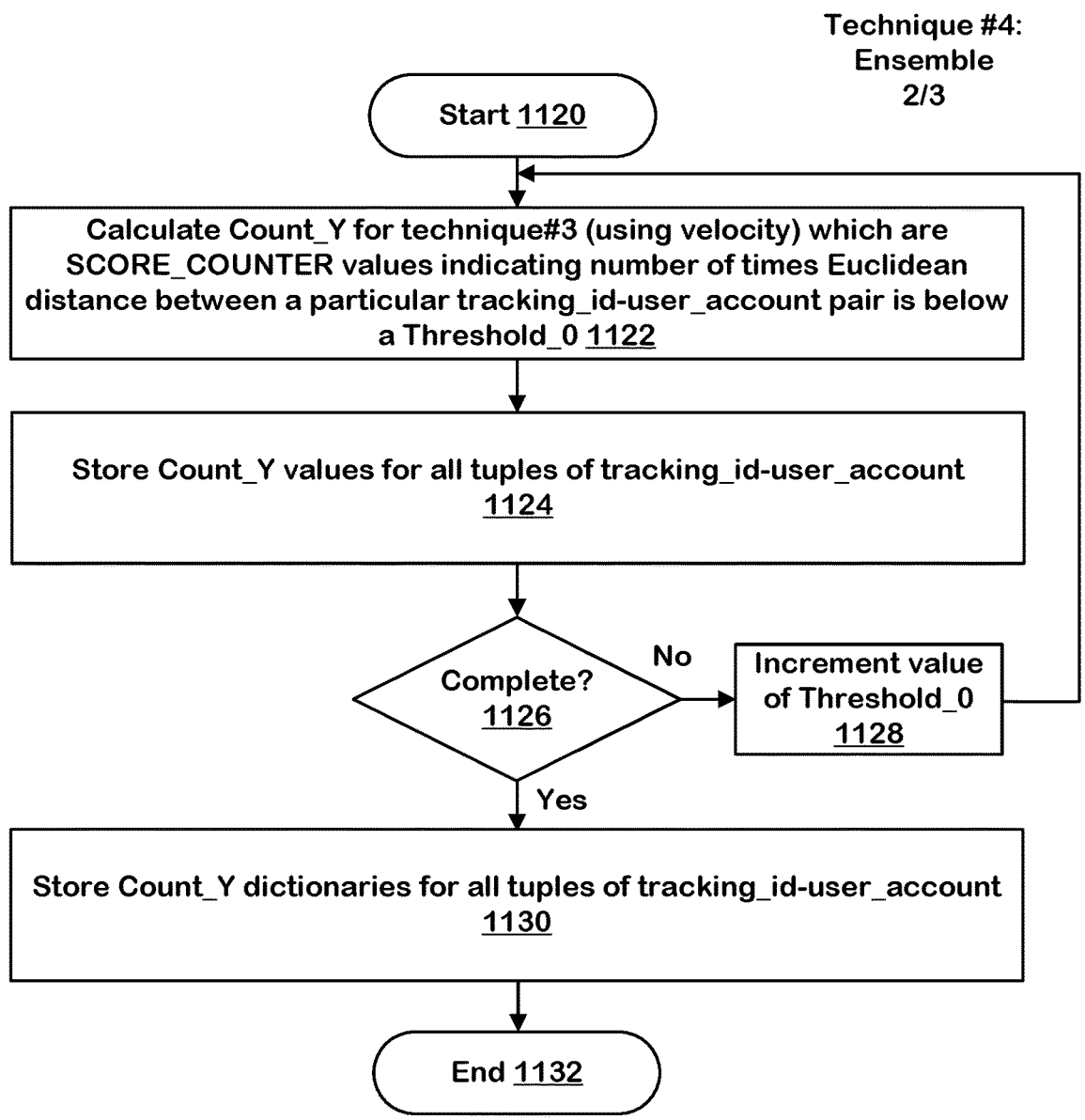
FIG. 11B is a flowchart showing a second part of process steps for matching a subject to a user account using a network ensemble.
Figure 11C:
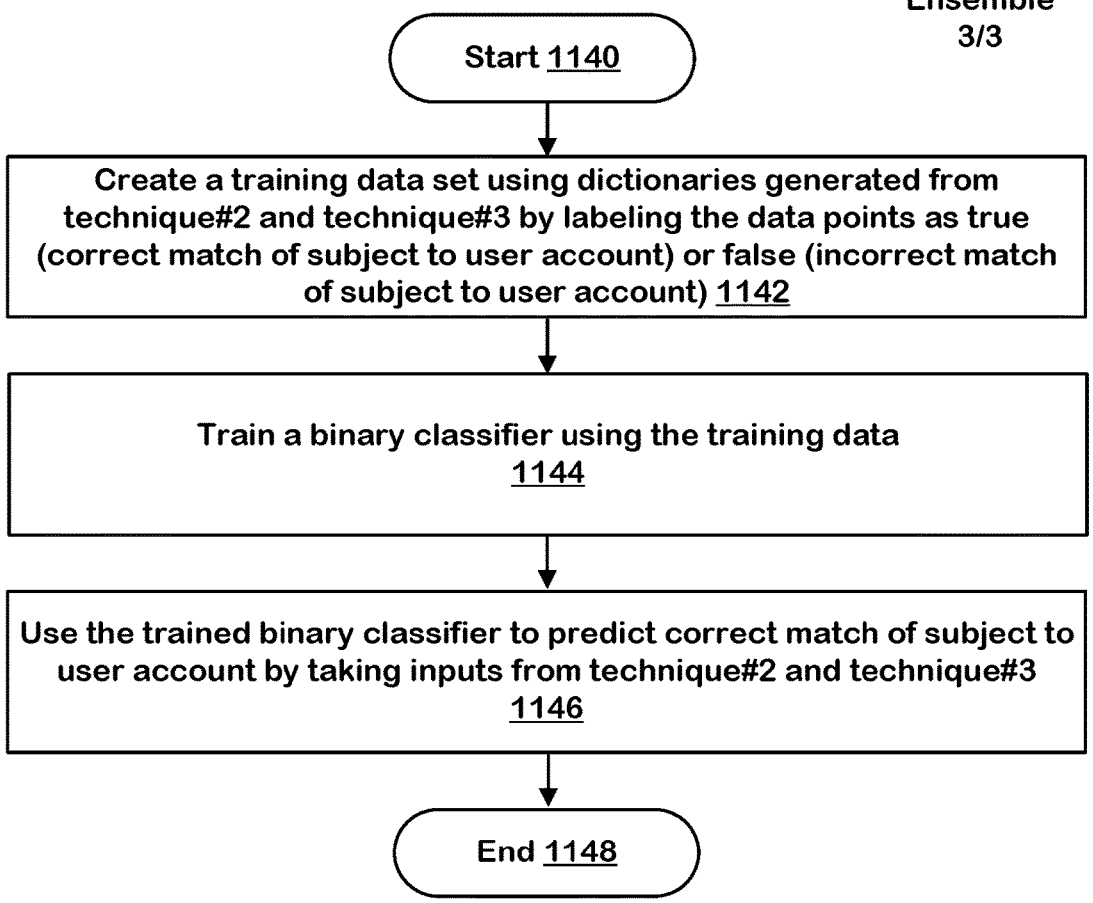
FIG. 11C is a flowchart showing a third part of process steps for matching a subject to a user account using a network ensemble.

A network ensemble is a learning paradigm where many networks are jointly used to solve a problem. Ensembles typically improve the prediction accuracy obtained from a single classifier by a factor that validates the effort and cost associated with learning multiple models. In the fourth technique to match user accounts to not yet linked tracked subjects, the second and third techniques presented above are jointly used in an ensemble (or network ensemble). To use the two techniques in an ensemble, relevant features are extracted from application of the two techniques. FIGS. 11A-11C present process steps (in a flowchart 1100) for extracting features, training the ensemble and using the trained ensemble to predict match of a user account to a not yet linked tracked subject.

FIG. 11A presents the process steps for generating features using the second technique that uses service location of mobile computing devices. The process starts at step 1102. At a step 1104, a Count_X, for the second technique is calculated indicating a number of times a service location of a mobile computing device with an unmatched user account is X meters away from all other mobile computing devices with unmatched user accounts. At step 1106, Count_X values of all tuples of tracking_id-user_account pairs is stored by the system for use by the ensemble. In one embodiment, multiple values of X are used e.g., 1 m, 2 m, 3 m, 4 m, 5 m (steps 1108 and 1110). For each value of X, the count is stored as a dictionary that maps tuples of tracking_id-user_account to count score, which is an integer. In the example where 5 values of X are used, five such dictionaries are created at step 1112. The process ends at step 1114.

FIG. 11B presents the process steps for generating features using the third technique that uses velocities of mobile computing devices. The process starts at step 1120. At a step 1122, a Count_Y, for the third technique is determined which is equal to score_counter values indicating number of times Euclidean distance between a particular tracking_id-user_account pair is below a threshold_0. At a step 1124, Count_Y values of all tuples of tracking_id-user_account pairs are stored by the system for use by the ensemble. In one embodiment, multiple values of threshold_0 are used e.g., five different values (steps 1126 and 1128). For each value of threshold_0, the Count_Y is stored as a dictionary that maps tuples of tracking_id-user_account to count score, which is an integer. In the example where 5 values of threshold are used, five such dictionaries are created at step 1130. The process ends at step 1132.

The features from the second and third techniques are then used to create a labeled training data set and used to train the network ensemble. To collect such a data set, multiple subjects (shoppers) walk in an area of real space such as a shopping store. The images of these subject are collected using cameras 114 at regular time intervals. Human labelers review the images and assign correct identifiers (tracking_id and user_account) to the images in the training data. The process is described in a flowchart 1100 presented in FIG. 16C. The process starts at a step 1140. At a step 1142, features in the form of Count_X and Count_Y dictionaries obtained from second and third techniques are compared with corresponding true labels assigned by the human labelers on the images to identify correct matches (true) and incorrect matches (false) of tracking_id and user_account.

As we have only two categories of outcome for each mapping of tracking_id and user_account: true or false, a binary classifier is trained using this training data set (step 1144). Commonly used methods for binary classification include decision trees, random forest, neural networks, gradient boost, support vector machines, etc. A trained binary classifier is used to categorize new probabilistic observations as true or false. The trained binary classifier is used in production (or inference) by giving as input Count_X and Count_Y dictionaries for tracking_id-user_account tuples. The trained binary classifier classifies each tuple as true or false at a step 1146. The process ends at a step 1148.

If there is an unmatched mobile computing device in the area of real space after application of the above four techniques, the system sends a notification to the mobile computing device to open the client application. If the user accepts the notification, the client application will display a semaphore image as described in the first technique. The system will then follow the steps in the first technique to check-in the shopper (match tracking_id to user_account). If the customer does not respond to the notification, the system will send a notification to an employee in the shopping store indicating the location of the unmatched customer. The employee can then walk to the customer, ask him to open the client application on his mobile computing device to check-in to the system using a semaphore image.

No biometric identifying information is used for matching the tracked subject with the user account, and none is stored in support of this process. That is, there is no information in the sequences of images used to compare with stored biometric information for the purposes of matching the tracked subjects with user accounts in support of this process. Thus, this logic to match the tracked subjects with user accounts operates without use of personal identifying biometric information associated with the user accounts.

Architecture

Figure 12:
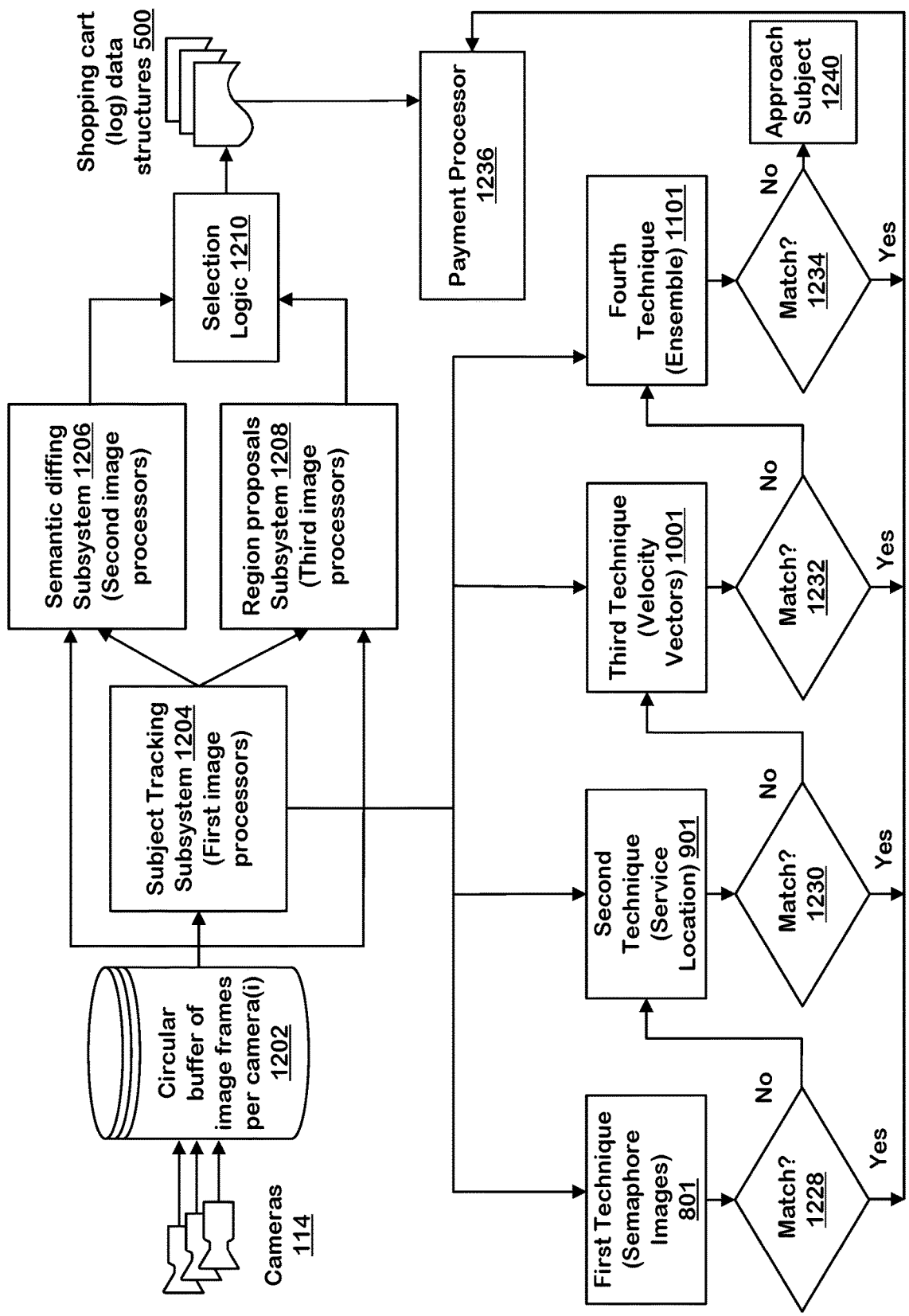
FIG. 12 is an example architecture in which the four techniques presented in FIGS. 8 to 11C are applied in an area of real space to reliably match a subject to a user account.

An example architecture of a system in which the four techniques presented above are applied to identify subjects by matching a user_account to a not yet linked tracked subject in an area of real space is presented in FIG. 12. Because FIG. 12 is an architectural diagram, certain details are omitted to improve the clarity of description. The system presented in FIG. 12 receives image frames from a plurality of cameras 114. As described above, in one embodiment, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space. The images are stored in a circular buffer of image frames per camera 1202.

A "subject tracking" subsystem 1204 (also referred to as first image processors) processes image frames received from cameras 114 to locate and track subjects in the real space. The first image processors include subject image recognition engines such as the JointsCNN above.

A "semantic diffing" subsystem 1206 (also referred to as second image processors) includes background image recognition engines, which receive corresponding sequences of images from the plurality of cameras and recognize semantically significant differences in the background (i.e. inventory display structures like shelves) as they relate to puts and takes of inventory items, for example, over time in the images from each camera. The second image processors receive output of the subject tracking subsystem 1204 and image frames from cameras 114 as input. Details of "semantic diffing" subsystem are presented in U.S. patent application Ser. No. 15/945,466, filed 4 Apr. 2018, (now issued U.S. Pat. No. 10,127,438) issued on 13 Nov. 2018, titled, "Predicting Inventory Events using Semantic Diffing," and U.S. patent application Ser. No. 15/945,473, filed 4 Apr. 2018, titled, "Predicting Inventory Events using Foreground/Background Processing," both of which are incorporated by reference as if fully set forth herein. The second image processors process identified background changes to make a first set of detections of takes of inventory items by tracked subjects and of puts of inventory items on inventory display structures by tracked subjects. The first set of detections is also referred to as background detections of puts and takes of inventory items. In the example of a shopping store, the first detections identify inventory items taken from the shelves or put on the shelves by customers or employees of the store. The semantic diffing subsystem includes the logic to associate identified background changes with tracked subjects.

A "region proposals" subsystem 1208 (also referred to as third image processors) includes foreground image recognition engines, receives corresponding sequences of images from the plurality of cameras 114, and recognizes semantically significant objects in the foreground (i.e. shoppers, their hands and inventory items) as they relate to puts and takes of inventory items, for example, over time in the images from each camera. The region proposals subsystem 1208 also receives output of the subject tracking subsystem 1204. The third image processors process sequences of images from cameras 114 to identify and classify foreground changes represented in the images in the corresponding sequences of images. The third image processors process identified foreground changes to make a second set of detections of takes of inventory items by tracked subjects and of puts of inventory items on inventory display structures by tracked subjects. The second set of detections is also referred to as foreground detection of puts and takes of inventory items. In the example of a shopping store, the second set of detections identifies takes of inventory items and puts of inventory items on inventory display structures by customers and employees of the store. The details of a region proposal subsystem are presented in U.S. patent application Ser. No. 15/907,112, filed 27 Feb. 2018, (now issued U.S. Pat. No. 10,133,933) issued on 20 November 2018, titled, "Item Put and Take Detection Using Image Recognition" which is incorporated by reference as if fully set forth herein.

The system described in FIG. 12 includes selection logic 1210 to process the first and second sets of detections to generate log data structures including lists of inventory items for tracked subjects. For a take or put in the real space, the selection logic 1210 selects the output from either the semantic diffing subsystem 1206 or the region proposals subsystem 1208. In one embodiment, the selection logic 1210 uses a confidence score generated by the semantic diffing subsystem for the first set of detections and a confidence score generated by the region proposals subsystem for a second set of detections to make the selection. The output of the subsystem with a higher confidence score for a particular detection is selected and used to generate a log data structure 1212 (also referred to as a shopping cart data structure) including a list of inventory items (and their quantities) associated with tracked subjects.

To process a payment for the items in the log data structure 1212, the system in FIG. 12 applies the four techniques for matching the tracked subject (associated with the log data) to a user_account which includes a payment method such as credit card or bank account information. In one embodiment, the four techniques are applied sequentially as shown in the figure. If the process steps in flowchart 800 for the first technique produce a match between the subject and the user account then this information is used by a payment processor 1236 to charge the customer for the inventory items in the log data structure. Otherwise (step 1228), the process steps presented in flowchart 900 for the second technique are followed and the user account is used by the payment processor 1236. If the second technique is unable to match the user account with a subject (1230) then the process steps presented in flowchart 1000 for the third technique are followed. If the third technique is unable to match the user account with a subject (1232) then the process steps in flowchart 1100 for the fourth technique are followed to match the user account with a subject.

If the fourth technique is unable to match the user account with a subject (1234), the system sends a notification to the mobile computing device to open the client application and follow the steps presented in the flowchart 800 for the first technique. If the customer does not respond to the notification, the system will send a notification to an employee in the shopping store indicating the location of the unmatched customer. The employee can then walk to the customer, ask him to open the client application on his mobile computing device to check-in to the system using a semaphore image (step 1240). It is understood that in other embodiments of the architecture presented in FIG. 12, fewer than four techniques can be used to match the user accounts to not yet linked tracked subjects.

Status Assignment to Subjects

Figure 13:
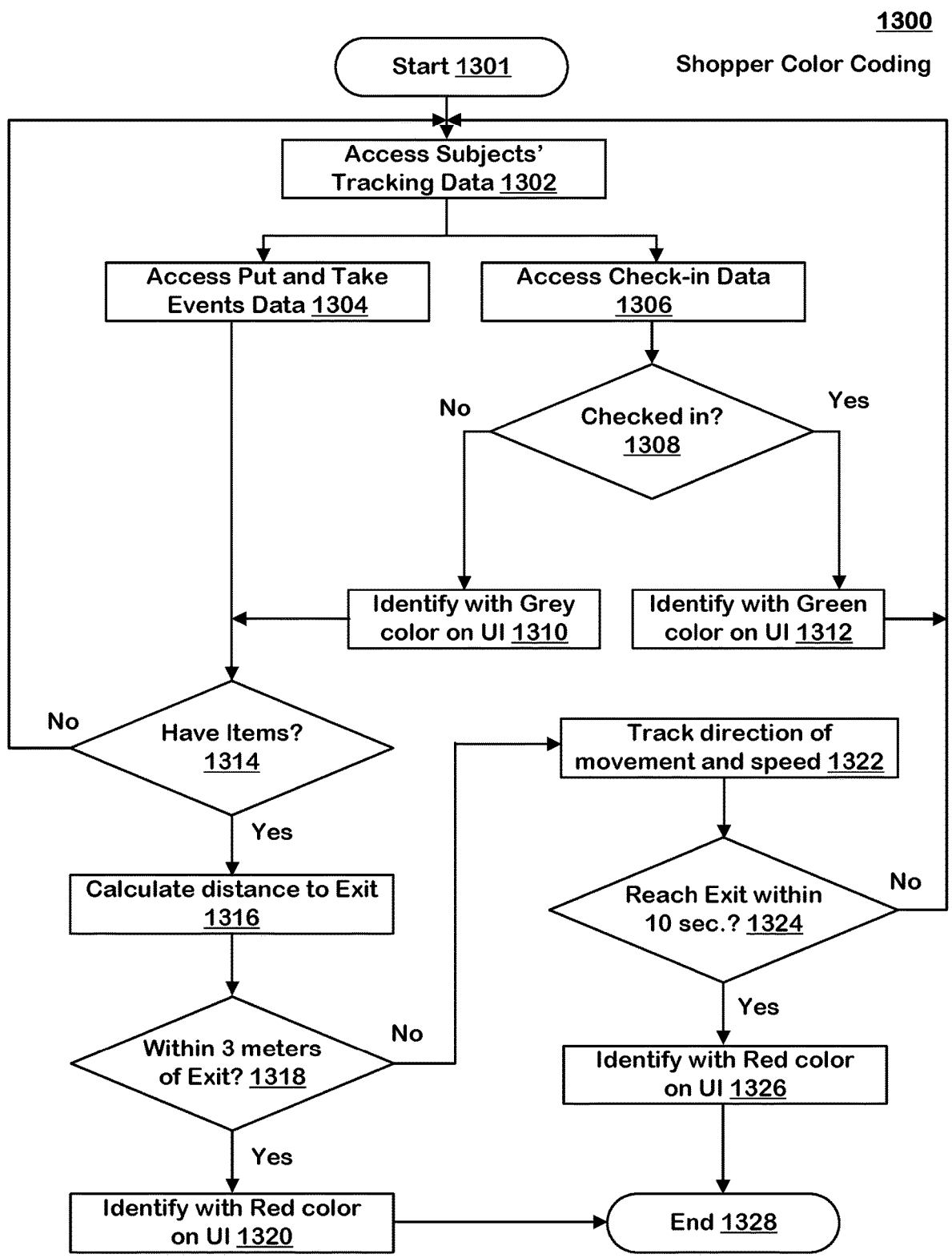
FIG. 13 is a flowchart showing process steps for determining statuses of subjects in the area of real space and generating alerts.

FIG. 13 illustrates an example of process steps for assigning statuses to subjects in the area of real space. The process in the illustrated example starts at a step 1301 of a process flowchart 1300. The technology disclosed accesses a first dataset identifying locations of subjects in the area of real space (step 1302). This data set is generated by tracking subjects in the area of real space and stored in the subject database 150. The technology disclosed accesses a second data set identifying item put and take events in the area of real space related to the subjects in the area of the real space (step 1304). These events are determined by region proposals subsystem 1208 or semantic diffing subsystem 1206 as described above and stored in the inventory events database 160. The technology disclosed accesses a third data set identifying whether a user account is matched, and optionally the user account, to the subjects in the first data set (step 1306). The accounts are matched to the subjects using matching engine as described above. The matching engine can use semaphore images, service location, speed and orientation of subjects and network ensemble techniques to match subjects to their respective accounts. The details of these techniques are described above.

The technology disclosed includes a graphical user interface that renders a map on the display of at least part of the area of real space including avatars having locations on the map corresponding to locations in the area of real space according to the first data set. The user interface logic identifies respective statuses assigned to the subjects based on one or more of the first data set, the second data set and the third data set. The display can be a touch sensitive display. The graphical user interface can include logic to respond to user input produced by interaction with the display to launch procedures linked to locations on the display or content of the display at the time of the user input. The details of the logic that identifies respective statuses of the subjects and displays subjects as avatars representing respective statuses assigned to the subjects is presented in the following process steps of the flowchart 1300.

For each subject in the first data set, the system determines at a step 1308 whether the subject is matched to a user account. If the subject is matched to a user account, the system assigns "checked-in" status to the subject. The system represents statuses assigned to subjects by color coding the avatars. For example, the system represents the subject that is assigned "checked-in" status with a green colored avatar on the map of the area of real space displayed on the GUI of the monitoring station (step 1312). If the system determines that the subject is not matched to a user account, the system assigns "not checked-in" status to the subject and represents the subject with a grey colored avatar on the map of the area of real space (step 1310).

At a step 1314, the system determines whether the subject with "not checked-in" status has taken items from inventory storage locations in the shopping store. The system uses put and take events data in the second data set for the subjects with "not checked-in" status to make this determination. If a subject has not taken items, the system does not change her status and keeps monitoring the status of the subject by repeating process steps 1302 to 1310.

The system includes logic that assigns statuses to the subjects by utilizing the first data set to determine distances of the subjects from an exit location in the area of real space. For example, if a "not checked-in" subject has taken items, the system calculates the subject's distance from an exit in the area of real space at a step 1316. If the subject is within a pre-defined distance to the exit e.g., 3 meters (step 1318), the subject is represented by a red colored avatar on the map displayed on the GUI of the monitoring station (step 1320).

The system includes logic that assigns statuses to subjects by utilizing the first data set to determine speeds of movement and directions of movement of the subjects. The system matches the directions of movements of the subjects to an exit location in the area of real space. The system can then determine respective expected times for the subjects to reach the exit location and at least one assigned status is a function of the determined respective expected times. For example, if the subject with a "not checked-in" status is farther away from the exit by the pre-defined distance (such as 3 meters), and that subject is represented as having taken an item, the system determines the direction of movement of the subject and speed of movement at a step 1322. In one embodiment, the system uses subject tracking engine to determine the direction of movement of the subject and the speed of movement. At a step 1324, the system determines whether the subject will reach the exit in the area of real space within a pre-determined time, for example 10 seconds. If the subject is not expected to reach the exits within a pre-determined time (such as 10 seconds), the system does not change the color coding of the subject's avatar and continues monitoring its status by repeating the step described above.

If the system determines, that the subject with a "not checked-in" status is expected to reach the exit location within the pre-determined time (such as 10 seconds) the system represents the subject with a red colored avatar on the map of the area of real space displayed on the GUI of the monitoring station (step 1326). The process ends at a step 1328.

In addition to the statuses assigned to the subjects as presented above in the process flowchart 1300, the system can access the data sets to assign additional statuses of the subjects and represent the subject using additional color coded avatars on the GUI of the monitoring stations. For example, the system can access the first data set of subjects identifying the tracking data of subjects to determine if a subject is stationary at a location in the area of real space for a period of time greater than a pre-defined threshold such as 30 seconds. This can indicate that the subject is in need of assistance in finding or choosing an item. The system assigns a "need assistance" status to the subject. The system can generate an alert for this subject on the GUI of the monitoring station by representing the subject with a yellow colored avatar. This will alert the employee viewing the monitoring station to help the subject.

The system can identify when a subject has fallen on the floor of the subject by identifying the joint locations of the subject within a pre-defined height from the floor. The system includes logic that displays a video feed of a particular subject on the user interface when a medical emergency status (or "requires attention" status) is assigned to the particular subject. For example, when locations of all joints of a subject are within one foot distance from the floor, the system can assign "requires attention" status to the subject and represent the subject with a yellow colored avatar on the GUI of the monitoring station. The system can also present a live video feed of the subject on a widget in the GUI of the monitoring station so that an employee at the monitoring station can assess the situation of the subject and take appropriate action. The employee can approach the subject or call an emergency response system.

The system can be trained to identify specific items that can be a threat to safety of subjects in the area of real space. For example, the system can be trained to identify different type of weapons. When the region proposal subsystem or the semantic diffing subsystem detects a weapon in the hands of a subject by, the system can assign "security risk" status to the subject and generate an alert by representing the avatar of the subject in red color on the GUI of the monitoring station, and produce a video feed showing the subject. The system also differentiates between employees of the shopping store and shopper by assigning "employee" status to subjects who are employees of the store and represent employees by blue colored avatars on the GUI of the monitoring stations. It is understood that the system can assign other statuses to subjects in addition to example statuses described above and represent the subject using different types of icons or avatars of different colors to represent those statuses.

The system can generate audible alerts or other alerts in addition to the representation of status by the avatars, to represent different statuses of subjects. The processing system can include a speaker. The alerts can comprise audible sounds played using the speaker. These alerts are generated as a function of the assigned statuses and locations for the subjects in the area of real space.

Network Configuration

Figure 14:
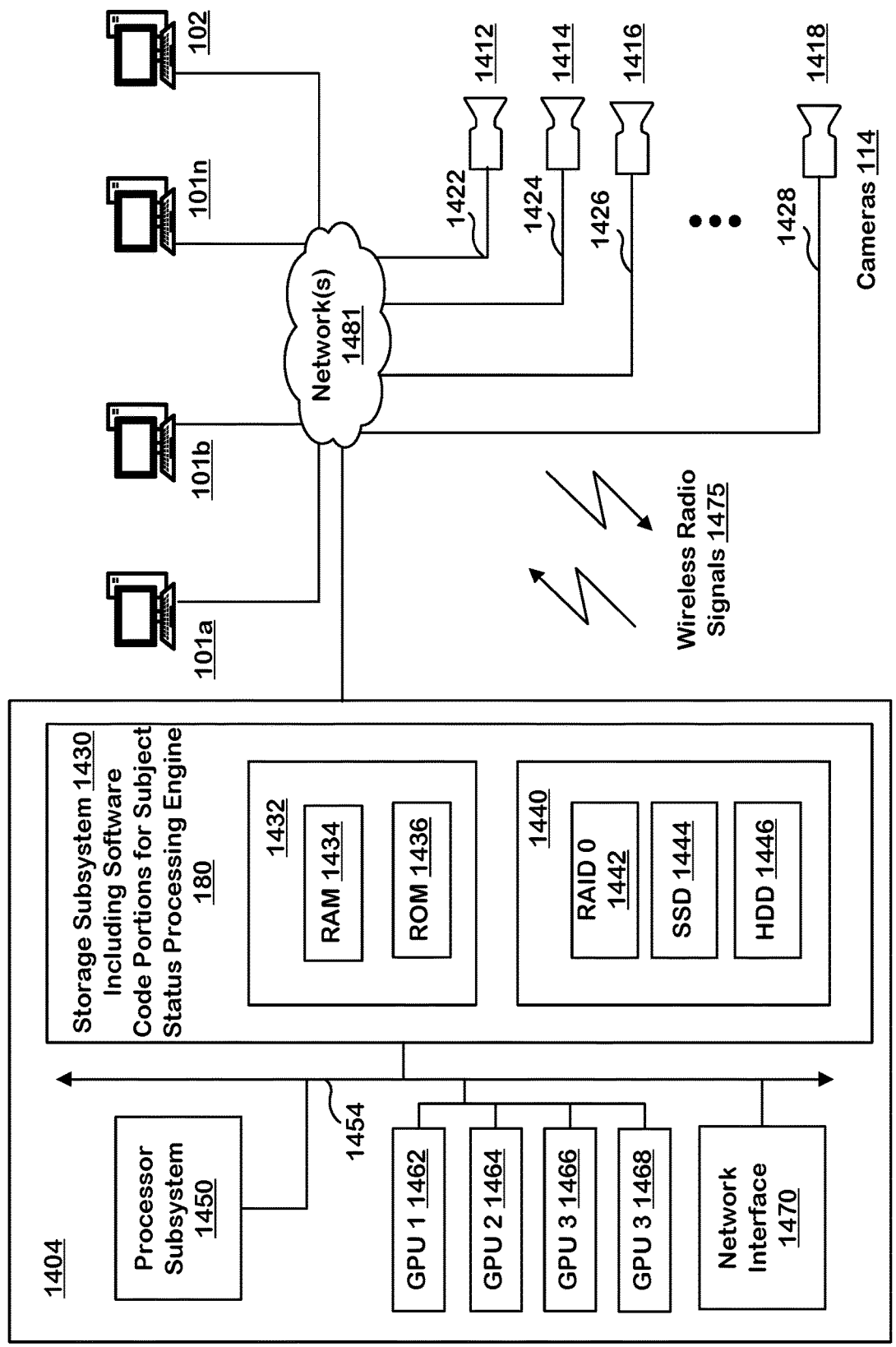
FIG. 14 is a camera and computer hardware arrangement configured for hosting the subject status processing engine of FIG. 1.

FIG. 14 presents architecture of a network hosting the subject persistence processing engine 180 which is hosted on the network node 1404. The system includes a plurality of network nodes 101a, 101b, 101n, and 102 in the illustrated embodiment. In such an embodiment, the network nodes are also referred to as processing platforms. Processing platforms (network nodes) 103, 101a-101n, and 102 and cameras 1412, 1414, 1416, . . . , 1418 are connected to network(s) 1481. A similar network hosts the matching engine 170 which is hosted on the network node 103.

FIG. 14 shows a plurality of cameras 1412, 1414, 1416, . . . , 1418 connected to the network(s). A large number of cameras can be deployed in particular systems. In one embodiment, the cameras 1412 to 1418 are connected to the network(s) 1481 using Ethernet-based connectors 1422, 1424, 1426, and 1428, respectively. In such an embodiment, the Ethernet-based connectors have a data transfer speed of 1 gigabit per second, also referred to as Gigabit Ethernet. It is understood that in other embodiments, cameras 114 are connected to the network using other types of network connections which can have a faster or slower data transfer rate than Gigabit Ethernet. Also, in alternative embodiments, a set of cameras can be connected directly to each processing platform, and the processing platforms can be coupled to a network.

Storage subsystem 1430 stores the basic programming and data constructs that provide the functionality of certain embodiments of the present invention. For example, the various modules implementing the functionality of the subject persistence processing engine 180 may be stored in storage subsystem 1430. The storage subsystem 1430 is an example of a computer readable memory comprising a non-transitory data storage medium, having computer instructions stored in the memory executable by a computer to perform all or any combination of the data processing and image processing functions described herein including logic to identify match located subjects with tracked subject, logic to link subjects in an area of real space with a user account, to determine locations of tracked subjects represented in the images, match the tracked subjects with user accounts by identifying locations of mobile computing devices executing client applications in the area of real space by processes as described herein. In other examples, the computer instructions can be stored in other types of memory, including portable memory, that comprise a non-transitory data storage medium or media, readable by a computer.

These software modules are generally executed by a processor subsystem 1450. A host memory subsystem 1432 typically includes a number of memories including a main random access memory (RAM) 1134 for storage of instructions and data during program execution and a read-only memory (ROM) 1436 in which fixed instructions are stored. In one embodiment, the RAM 1434 is used as a buffer for storing point cloud data structure tuples generated by the inventory event location processing engine 180.

A file storage subsystem 1440 provides persistent storage for program and data files. In an example embodiment, the storage subsystem 1440 includes four 120 Gigabyte (GB) solid state disks (SSD) in a RAID 0 (redundant array of independent disks) arrangement identified by a numeral 1442. In the example embodiment, maps data in the maps database 140, subjects data in the subjects database 150, inventory events data in the inventory events database 160, the user data in the user database 164, and the image data in the image database 166 which is not in RAM is stored in RAID 0. In the example embodiment, the hard disk drive (HDD) 1446 is slower in access speed than the RAID 0 1442 storage. The solid state disk (SSD) 1444 contains the operating system and related files for the inventory event location processing engine 180.

In an example configuration, four cameras 1412, 1414, 1416, 1418, are connected to the processing platform (network node) 103. Each camera has a dedicated graphics processing unit GPU 1 1462, GPU 2 1464, GPU 3 1466, and GPU 4 1468, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 1450, the storage subsystem 1430 and the GPUs 1462, 1464, and 1466 communicate using the bus subsystem 1454.

A network interface subsystem 1470 is connected to the bus subsystem 1454 forming part of the processing platform (network node) 104. Network interface subsystem 1470 provides an interface to outside networks, including an interface to corresponding interface devices in other computer systems. The network interface subsystem 1470 allows the processing platform to communicate over the network either by using cables (or wires) or wirelessly. The wireless radio signals 1475 emitted by the mobile computing devices in the area of real space are received (via the wireless access points) by the network interface subsystem 1470 for processing by the matching engine 170. A number of peripheral devices such as user interface output devices and user interface input devices are also connected to the bus subsystem 1454 forming part of the processing platform (network node) 104. These subsystems and devices are intentionally not shown in FIG. 14 to improve the clarity of the description. Although bus subsystem 1454 is shown schematically as a single bus, alternative embodiments of the bus subsystem may use multiple busses.

In one embodiment, the cameras 114 can be implemented using Chameleon3 1.3 MP Color USB3 Vision (Sony ICX445), having a resolution of 1288×964, a frame rate of 30 FPS, and at 1.3 MegaPixels per image, with Varifocal Lens having a working distance (mm) of 300-∞, a field of view field of view with a ⅓" sensor of 98.2°-23.8°.

Any data structures and code described or referenced above are stored according to many implementations in computer readable memory, which comprises a non-transitory computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A system for monitoring status of subjects in an area of real space, comprising:
   a processing system, including a display and having access to memory storing a first data set identifying locations of subjects in the area of real space over time, a second data set identifying item put and take events in the area of real space related to the subjects in the first data set, and a third data set identifying accounts matched to the subjects in first data set; and
   a graphical user interface that renders a map on the display of at least part of the area of real space including avatars having locations on the map corresponding to locations in the area of real space according to the first data set, and identifying respective statuses assigned to the subjects based on one or more of the first data set, the second data set and the third data set, wherein the processing system includes or has access to logic that assigns respective statuses to the subjects, the logic including:
   logic that utilizes the first data set to determine speeds of movement and directions of movement of the subjects,
   logic that matches the directions of movements of the subjects to an exit location in the area of real space, and
   logic that determines respective expected times for the subjects to reach the exit location and at least one assigned status is a function of the determined respective expected times.

2. The system of claim 1, wherein the graphical user interface includes logic to respond to user input produced by interaction with the display to launch procedures linked to locations on the display or content of the display at the time of the user input.

3. The system of claim 1, including identifying the respective statuses by color coding the avatars.

4. The system of claim 1, further including logic that generates alerts as a function of the assigned statuses and locations for the subjects, and the processing system includes a speaker, and the alerts comprise audible sounds played using the speaker.

5. The system of claim 1, wherein the processing system includes or has access to logic that assigns respective statuses to the subjects including logic that utilizes the first data set to determine distances of the subjects from an exit location in the area of real space, and at least one assigned status is a function of the determined distance.

6. The system of claim 1, wherein the processing system includes or has access to logic that assigns respective statuses to the subjects, the logic including:
   logic that displays a video feed of a particular subject on the display when the particular subject is assigned an attention status.

7. The system of claim 1, the processing system including or having access to logic that uses sequences of frames in a plurality of sequences of frames to generate the first data set identifying locations of subjects in the area of real space over time including logic to detect subjects as respective constellations of joints in the area of real space, a joint in the constellation of joints including a location represented by positions in three dimensions of the area of real space and a timestamp.

8. A method for monitoring status of subjects in an area of real space for a system including a first data set identifying locations of subjects in the area of real space over time, a second data set identifying item put and take events in the area of real space related to the subjects in the first data set, and a third data set identifying accounts matched to the subjects in the first data set, the method including:
   executing a graphical user interface on a display at a monitoring node, the graphical user interface including a map of at least part of the area of real space including avatars identifying locations of subjects located on the map;
   representing respective statuses assigned to the subjects located on the map, the statuses assigned to the subjects based on one or more of the first data set, the second data set and the third data set, wherein the assigning respective statuses to the subjects are assigned:
   utilizing the first data set to determine speeds of movement and directions of movement of the subjects,
   matching the directions of movements of the subjects to an exit location in the area of real space, and
   determining respective expected times for the subjects to reach the exit location and, at least one assigned status is a function of the determined respective expected times.

9. The method of claim 8, wherein executing the graphical user interface includes responding to user input produced by interaction with the display to launch procedures linked to locations on the display or content of the display at the time of the user input.

10. The method of claim 8, including identifying the respective statuses by color coding the avatars.

11. The method of claim 8, further including generating alerts as a function of the assigned statuses and locations for the subjects, and the alerts comprise audible sounds.

12. The method of claim 8, wherein at least one assigned status is assigned utilizing the first data set to determine distances of the subjects from an exit location in the area of real space.

13. The method of claim 8, wherein the assigning respective statuses to the subjects further includes:
   displaying a video feed of a particular subject on a user interface when the particular subject is assigned an attention status.

14. The method of claim 8, wherein the first data set is generated using sequences of frames of corresponding fields of view in the real space, wherein the using the sequences of frames to generate the first data set includes detecting subjects as respective constellations of joints in the area of real space, wherein a joint in the constellation of joints includes a location represented by positions in three dimensions of the area of real space and a timestamp.

15. A non-transitory computer readable storage medium impressed with computer program instructions to monitor status of subjects in an area of real space for a system including, a first data set identifying locations of subjects in the area of real space over time, a second data set identifying item put and take events in the area of real space related to the subjects in the first data set, and a third data set identifying accounts matched to the subjects in the first data set, the instructions, when executed on a processor, implement a method comprising:

executing a graphical user interface on a display at a monitoring node, the graphical user interface including a map of at least part of the area of real space including avatars identifying locations of subjects located on the map;

representing respective statuses assigned to the subjects located on the map, the statuses assigned to the subjects based on one or more of the first data set, the second data set and the third data set, wherein the assigning respective statuses to the subjects are assigned:

utilizing the first data set to determine speeds of movement and directions of movement of the subjects, matching the directions of movements of the subjects to an exit location in the area of real space, and determining respective expected times for the subjects to reach the exit location and, at least one assigned status is a function of the determined respective expected times.

16. The non-transitory computer readable storage medium of claim 15, wherein executing the graphical user interface includes responding to user input produced by interaction with the display to launch procedures linked to locations on the display or content of the display at the time of the user input.

17. The non-transitory computer readable storage medium of claim 15, implementing the method further comprising: identifying the respective statuses by color coding the avatars.

18. The non-transitory computer readable storage medium of claim 15, implementing the method further comprising: generating alerts as a function of the assigned statuses and locations for the subjects, and the alerts comprise audible sounds.

19. The non-transitory computer readable storage medium of claim 15, wherein at least one assigned status is assigned utilizing the first data set to determine distances of the subjects from an exit location in the area of real space.

20. The non-transitory computer readable storage medium of claim 15, wherein the assigning respective statuses to the subjects further includes:

displaying a video feed of a particular subject on a user interface when the particular subject is assigned an attention status.

21. The non-transitory computer readable storage medium of claim 15, wherein the first data set is generated using sequences of frames of corresponding fields of view in the real space, wherein the using the sequences of frames to generate the first data set includes detecting subjects as respective constellations of joints in the area of real space, wherein a joint in the constellation of joints includes a location represented by positions in three dimensions of the area of real space and a timestamp.

* * * * *